United States Patent
Fuchs et al.

(10) Patent No.: US 10,893,127 B1
(45) Date of Patent: Jan. 12, 2021

(54) SYSTEM AND METHOD FOR COMMUNICATING INTERACTIVE DATA BETWEEN HETEROGENEOUS DEVICES

(71) Applicant: Arkade, Inc., Centennial, CO (US)

(72) Inventors: Joshua Allan Fuchs, Granada Hills, CA (US); Joel Abraham Kort, Van Nuys, CA (US); Charles Michael Seltzer, Sag Harbor, NY (US); Bob Steven Berns, Hidden Hills, CA (US)

(73) Assignee: Arkade, Inc., Centennial, CO (US)

( * ) Notice: Subject to any disclaimer, the term of this patent is extended or adjusted under 35 U.S.C. 154(b) by 0 days.

(21) Appl. No.: 16/852,263

(22) Filed: Apr. 17, 2020

Related U.S. Application Data

(63) Continuation-in-part of application No. 16/746,734, filed on Jan. 17, 2020, now Pat. No. 10,773,157.
(Continued)

(51) Int. Cl.
| | | |
|---|---|---|
| *H04L 29/06* | (2006.01) | |
| *H04L 29/08* | (2006.01) | |
| *A63F 13/235* | (2014.01) | |

(52) U.S. Cl.
CPC ............ *H04L 69/08* (2013.01); *A63F 13/235* (2014.09); *H04L 67/141* (2013.01);
(Continued)

(58) Field of Classification Search
CPC ... H04L 69/08; H04L 67/141; H04L 67/2871; H04L 2212/00; A63F 13/235; A63F 2300/1031; A63F 13/355
See application file for complete search history.

(56) References Cited

U.S. PATENT DOCUMENTS

| | | |
|---|---|---|
| 5,641,288 A | 6/1997 | Zaenglein, Jr. |
| 6,020,885 A | 2/2000 | Honda |

(Continued)

FOREIGN PATENT DOCUMENTS

| | | |
|---|---|---|
| CN | 206631173 | 11/2017 |
| WO | WO-2007/130582 | 11/2007 |

OTHER PUBLICATIONS

AR Blaster—360° Augmented Reality Video Game—Smart Phone Toy Gun Controller for iPhone & Android phones—Bluetooth 4.2 Mar. 24, 2020 from url link: https://www.amazon.com/AR-Blaster-Augmented-Reality-Controller-Bluetooth/dp/B0762T1YYK/ref=pd_sbs_147_4/143-0087825-2430220?_encoding=UTF8&pd_rd_i=B0762T1YYK&pd_rd_r=ffcE351e-f9ba-4c51-ad97-cb3097544121&pd_rd_w=mx37J&pd_rd_wg=F34Wd&pf_rd_p=7cd8f929-4345-4bf2-a554-7d7588b3dd5f&pf_rd_r=Z3N3YWQZ715NJRFJQFVY&psc=1&refRID=Z3N3YWQZ715NJRFJQFVY March.
(Continued)

*Primary Examiner* — Dmitry Suhol
*Assistant Examiner* — Carl V Larsen
(74) *Attorney, Agent, or Firm* — Foley & Lardner LLP

(57) ABSTRACT

A method for communicating interactive data between heterogeneous devices, comprising receiving, by an intermediary computing device via a first wireless interface from a first computing device, interactive data from at least one sensor of the first computing device; extracting, by the intermediary computing device, at least one data string from the received interactive data; encapsulating, by the intermediary computing device, the extracted at least one data string in a transport layer header; and transmitting, by the intermediary computing device via a second wireless interface to a second computing device, the encapsulated at least one data string, wherein the second computing device extracts the at least one data string from the encapsulated transmis-
(Continued)

sion and forwards the at least one data string to a virtual human interface device (HID) driver executed by an operating system of the second computing device.

20 Claims, 17 Drawing Sheets

Related U.S. Application Data which is a continuation-in-part of application No. 16/523,891, filed on Jul. 26, 2019.

(52) U.S. Cl.
CPC ... *A63F 2300/1031* (2013.01); *H04L 67/2871* (2013.01); *H04L 2212/00* (2013.01)

(56) References Cited

U.S. PATENT DOCUMENTS

| | | | |
|---|---|---|---|
| 6,054,991 | A | 4/2000 | Crane et al. |
| 6,184,847 | B1 | 2/2001 | Fateh et al. |
| 6,396,497 | B1 | 5/2002 | Reichlen |
| 6,684,062 | B1* | 1/2004 | Gosior .................... A63F 13/02 455/73 |
| 6,966,837 | B1 | 11/2005 | Best |
| 7,319,992 | B2 | 1/2008 | Gaos |
| 8,303,405 | B2 | 11/2012 | Zalewski et al. |
| 8,469,824 | B1 | 6/2013 | Farley et al. |
| 8,814,682 | B2 | 8/2014 | Yamashita et al. |
| 9,041,741 | B2 | 5/2015 | Mabbutt et al. |
| 9,110,505 | B2 | 8/2015 | Mastandrea, Jr. |
| 9,724,601 | B2 | 8/2017 | Fujita et al. |
| 10,021,149 | B2 | 7/2018 | Miller |
| 10,075,750 | B2 | 9/2018 | Gordon et al. |
| 10,155,170 | B2 | 12/2018 | Ikeda et al. |
| 10,471,345 | B1 | 11/2019 | Fuchs et al. |
| 10,630,773 | B2 | 4/2020 | Holmes |
| 2002/0128064 | A1 | 9/2002 | Sobota |
| 2004/0178576 | A1 | 9/2004 | Hillis et al. |
| 2005/0197178 | A1 | 9/2005 | Villegas |
| 2007/0021210 | A1 | 1/2007 | Tachibana |
| 2009/0197679 | A1 | 8/2009 | Argentar |
| 2009/0280901 | A1 | 11/2009 | Casparian et al. |
| 2010/0255903 | A1* | 10/2010 | Bala .................... H04N 21/84 463/30 |
| 2010/0304868 | A1 | 12/2010 | Zalewski |
| 2012/0302348 | A1 | 11/2012 | Karacal et al. |
| 2013/0090165 | A1 | 4/2013 | Shikata et al. |
| 2013/0109473 | A1 | 5/2013 | Yamashita et al. |
| 2013/0225295 | A1 | 8/2013 | Lee |
| 2014/0179423 | A1 | 6/2014 | Deng et al. |
| 2014/0213365 | A1 | 7/2014 | Cao |
| 2014/0280692 | A1* | 9/2014 | Cotter .................... A63F 13/30 709/217 |
| 2014/0364063 | A1 | 12/2014 | Bell |
| 2015/0087414 | A1* | 3/2015 | Chen .................... A63F 13/355 463/31 |
| 2015/0141145 | A1 | 5/2015 | Perlman et al. |
| 2015/0229509 | A1* | 8/2015 | Castine .................... G06F 15/16 709/208 |
| 2015/0238855 | A1 | 8/2015 | Uy et al. |
| 2016/0321947 | A1 | 11/2016 | Toronto et al. |
| 2016/0343164 | A1 | 11/2016 | Urbach et al. |
| 2017/0072307 | A1* | 3/2017 | Perry .................... A63F 13/355 |
| 2017/0072309 | A1 | 3/2017 | Perry et al. |
| 2017/0354864 | A1 | 12/2017 | Rogers et al. |
| 2017/0354878 | A1* | 12/2017 | Posin .................... A63F 13/335 |
| 2017/0354895 | A1 | 12/2017 | Dornbusch et al. |
| 2017/0365102 | A1 | 12/2017 | Huston et al. |
| 2018/0104574 | A1 | 4/2018 | Tager |
| 2018/0143976 | A1 | 5/2018 | Huston |
| 2018/0264321 | A1 | 9/2018 | Nir et al. |
| 2019/0081848 | A1 | 3/2019 | Zou |
| 2019/0270019 | A1* | 9/2019 | Miura .................... A63F 13/23 |
| 2019/0321732 | A1 | 10/2019 | Zimring et al. |
| 2020/0108312 | A1 | 4/2020 | Chen |

OTHER PUBLICATIONS

AR Blaster Augmented Reality 360 Degree Portable Gaming VR Gun: Wireless Bluetooth Controller Toy Pistol for iOS Phone and Android Smartphones Mar. 24, 2020 from url link: https://www.amazon.com/AR-BLASTER-Augmented-Reality-Portable/dp/B07769PM5L/ref=pd_rhf_eeolp_p_img_5?_encoding=UTF8&psc=1&refRID=34N965YW8TV4Y45CPECQ Mar. 24, 2020.

AR Game Gun Augmented Reality VR Gun Controller Joysticker Gamepad for Video Game with Bluetooth Connecting iOS, Android Smart Phone iPad TV Box Shooting Game Mar. 24, 2020 from url link: https://www.amazon.com/Augmented-Controller-Joysticker-Bluetooth-Connecting/dp/B06XT11RNW/ref=pd_di_sccai_1/144-3233725-9935121?_encoding=UTF8&pd_rd_i=B06XT11RNW&pd_rd_r=77ef4782-0163-4631-9e66-216524c94ca3&pd_rd_w=j0PaW&pd_rd_wg=54eYz&pf_rd_p=e532f109-986a-4c2d-85fc-16555146f6b4&pf_rd_r=W6V7AC8ZJX3CN6GD5A3Z&p.

AR Games Gun Augmented Reality Bluetooth Game Controller with Cell Phone Stand Holder Portable and Eco-Friendly AR Toy with 360? AR Games for iPhone Android (L Green) Mar. 24, 2020 from url link: https://www.amazon.com/Augmented-Bluetooth-Controller-Portable-Eco-Friendly/dp/B0737BSQJ5/ref=pd_sbs_147_12?_encoding=UTF8&pd_rd_i=B0737BSQJ5&pd_rd_r=ffc5351e-f9ba-4c51-ad97-cb3097544121&pd_rd_w=mx37J&pd_rd_wg=F34Wd&pf_rd_p=7cd8f929-4345-4bf2-a554-7d7588b3dd5f&pf_rd_r=Z3N3YWQZ715NJRFJQFVY&psc=1&refRID=.

AR Super Space Gun New AR Augmented Reality Technology Portable Bluetooth Game Gun for Smart Phones Sale VR Virtual Reality Online Game Mar. 24, 2020 from url link: https://www.amazon.com/Augmented-Technology-Bluetooth-Smart-Thanksgiving/dp/B077G925W9/ref=pd_sbs_147_2/143-0087825-2430220?_encoding=UTF8&pd_rd_i=B077G925W9&pd_rd_r=4462b707-830f-498f-b30d-27ed09634928&pd_rd_w=CNqyh&pd_rd_wg=B0IL6&pf_rd_p=7cd8f929-4345-4bf2-a554-7d7588b3dd5f&pf_rd_r=V45C6T2VP8TXZXV3KR8J&psc=1&refRID=V45C6T2VP8TXZXV.

AR Toy Gun with 38 Games Bluetooth 3D Virtual Reality VR Game Toys for Android iOS Phones Mar. 24, 2020 from url link: https://www.amazon.com/Bluetooth-Virtual-Reality-Android-Phones/dp/B07KBTT3BV/ref=pd_sbs_21_1/143-0087825-2430220?_encoding=UTF8&pd_rd_i=B07KBTT3BV&pd_rd_r=ac895c7c-cbe3-4b21-ae06-85475f759e04&pd_rd_w=pe6ak&pd_rd_wg=zGUn2&pf_rd_p=7cd8f929-4345-4bf2-a554-7d7588b3dd5f&pf_rd_r=9FYAG5XQRX6JSWANBSV4&psc=1&refRID=9FYAG5XQRX6JSWANBSV4 Mar. 24, 2020.

DoinMaster Bluetooth Shooting Gamepad AR Gun Joystick for Android iOS Phone iPhone iPad AR Game Controller with Motor Vibration Mar. 24, 2020 from url link: https://www.amazon.com/DoinMaster-Bluetooth-Shooting-Controller-Vibration/dp/B07V78Z5D2/ref=pd_sbs_147_1/143-0087825-2430220?_encoding=UTF8&pd_rd_i=B07V78Z5D2&pd_rd_r=ffc5351e-f9ba-4c51-ad97-cb3097544121&pd_rd_w=mx37J&pd_rd_wg=F34Wd&pf_rd_p=7cd8f929-4345-4bf2-a554-7d7588b3dd5f&pf_rd_r=Z3N3YWQZ715NJRFJQFVY&psc=1&refRID=Z3N3YWQZ715NJRFJQFVY M.

IPega PG-9057 / Phantom Blaster Bluetooth Gun Game Controller Wireless Bluetooth 3.0 With Stand for Android 3.2 IOS 7.0 Above Smartphones Tablet PC Win7 Win8 Win10 Computer Mar. 24, 2020 from url link: https://www.amazon.com/iPega-PG-9057-Bluetooth-Controller-Smartphones/dp/B01MU7YA5I/ref=pd_sbs_147_15?_encoding=UTF8&pd_rd_i=B01MU7YA5I&pd_rd_r=ffc5351e-f9ba-4c51-ad97-cb3097544121&pd_rd_w=mx37J&pd_rd_wg=F34Wd&pf_rd_p=7cd8f929-4345-4bf2-a554-7d7588b3dd5f&pf_rd_r=Z3N3YWQZ715NJRFJQFVY&psc=1&refR.

Sharper Image Augmented Virtual Reality Toy Blaster, Complete Video Gaming System, Connects to Smartphone via Bluetooth, Use with Free AR App, Games for Teens and Kids, Lime Green/Blue/Orange Mar. 24, 2020 from url link: https://www.amazon.com/Sharper-Image-Augmented-Smartphone-Bluetooth/dp/B07BRFRPMY/

(56) References Cited

OTHER PUBLICATIONS ref=pd_sbs_21_8?_encoding=UTF8&pd_rd_i=B07BRFRPMY&pd_rd_r=64e669ad-5a4f-49ba-aece-4e60701b72b9&pd_rd_w=Iwoi2&pd_rd_wg=kO9MI&pf_rd_p=7cd8f929-4345-4bf2-a554-7d7588b3dd5f&pf_rd_r=268ESN8N75NMYWN4K72.

Sharper Image Virtual Reality Interactive Blaster March 24, 2020 from url link: https://www.amazon.com/Sharper-Image-Virtual-Reality-Blaster/dp/B07KFM4X4C/ref=pd_sbs_147_3/143-0087825-2430220?_encoding=UTF8&pd_rd_i=B07KFM4X4C&pd_rd_r=ffc5351e-f9ba-4c51-ad97-cb3097544121&pd_rd_w=mx37J&pd_rd_wg=F34Wd&pf_rd_p=7cd8f929-4345-4bf2-a554-7d7588b3dd5f&pf_rd_r=Z3N3YWQZ715NJRFJQFVY&psc=1&refRID=Z3N3YWQZ715NJRFJQFVY March 24, 2020

Analog Stick. Wikipedia.org. Online. Jul. 30, 2018. Accessed via the Internet. Accessed May 8, 2020. <URL: https://en.wikipedia.org/w/index.php?title=Analog_stick&oldid=852699675> (Year: 2018).

AR Games Gun. Amazon.com. Online. Jun. 22, 2017. Accessed via the Internet. Accessed May 11, 2020. (Year: 2017).

AR Games Gun. Amazon.com. Online. Jun. 22, 2017. Accessed via the Internet. Accessed May 11, 2020. <URL: https://www.amazon.com/Augmented-Bluetooth-Controller-Portable-Eco-Friendly/dp/B0737BSQJ> (Year: 2017).

ArtCreativity Blade Runner Toy Pistol. Amazon.com. Online. Feb. 21, 2019. Accessed via the Internet. Accessed May 8, 2020. <URL: https://www.amazon.com/pistola-artcreativity-incluidas-resistente-pl%C3%A1stico/dp/B0797BBT1J/> (Year: 2019).

Doinmaster Bluetooth Gamepad. Amazon.com. Online Jul. 14, 2019. Accessed via the Internet. Accessed May 8, 2020. <URL: https://www.amazon.com/Dain Master-Bluetooth-Shooting-Controller-Vibration/dp/B07V78Z5 D2/> (Year: 2019).

Qkifly AR Game Gun. Amazon.com. Online. Dec. 2, 2016. Accessed via the Internet. Accessed May 8, 2020. <URL: https://www.amazon.com/Augmented-Controller-Joysticker-Bluetooth-Connecting/dp/B06XT11 RNW/> (Year: 2016).

What is HDbitT? hdbitt.org. Online. Apr. 16, 2018. Accessed via the Internet. Accessed May 11, 2020. (Year: 2018).

What is HDbitT? hdbitt.org. Online. Apr. 16, 2018. Accessed via the Internet. Accessed May 11, 2020. <URL: https://web.archive.org/web/20180416182117/http://www.hdbitt.org:80/what-is-hdbitt.html> (Year: 2018).

\* cited by examiner

SYSTEM AND METHOD FOR COMMUNICATING INTERACTIVE DATA BETWEEN HETEROGENEOUS DEVICES

CROSS-REFERENCE TO RELATED APPLICATIONS

This application is a continuation-in-part of U.S. application Ser. No. 16/746,734, filed on Jan. 17, 2020, which is a continuation-in-part of U.S. application Ser. No. 16/523,891, filed on Jul. 26, 2019, both of which are hereby incorporated by reference herein in their entireties.

BACKGROUND

The following description is provided to assist the understanding of the reader. None of the information provided or references cited is admitted to be prior art.

Video game consoles today typically use an external remote controller to allow a user to interact with a game being processed by the video game console. Video game consoles are generally connected to an external screen (e.g., a television) that remains stationary in relation to the video game consoles. The stationary screens can inhibit gamers that wish to move around and receive a more interactive experience. While users can move various characters or other figures on the stationary screens through controller inputs, the users may feel disconnected from the game they are playing. For example, a user may move a character through a virtual battlefield displayed on a stationary screen. The user may fire at other characters on an enemy team on the virtual battlefield using a joystick and various push buttons that correspond to various actions. The user may not feel connected to the game because pressing push buttons and moving a joystick is dissimilar from being on the battlefield itself, impairing immersion and realism of the simulation.

Furthermore, in some instances, an external remote controller may not have a compatible wireless communication interface with another computing device. For example, an external remote controller may only be able to communicate with other computing devices via a particular communication protocol such as Bluetooth. However, many computing devices and particularly older computing devices lack Bluetooth communications hardware, and may only be able to communicate with other devices via a WiFi communication protocol. Because the external remote controller and the computing device may communicate via different or incompatible communication protocols, the external remote controller and the computing device may not be able to communicate with each other. Such devices with incompatible communications interfaces may be referred to as heterogeneous devices, heterogeneous communications devices, or by similar terms.

SUMMARY

Implementations of the systems and methods discussed herein provide for improvements in communication between heterogeneous devices, or devices without compatible communication interfaces. For example, in some implementations, to enable a first device to communicate with a second device despite the two devices being limited to incompatible communication interfaces, an intermediary device may operate as a communications bridge between the two devices. The intermediary device may communicate with the first device via a first communication protocol and the second device via a different second communication protocol. The intermediary device may receive communications from the first device and transmit corresponding communications (e.g., communications having the same information) to the second device. In some implementations, for example, the intermediary device may communicate with the first device via Bluetooth or Bluetooth Low Energy and the second device via WiFi. Transmitting data via Bluetooth or Bluetooth Low Energy may use less power than transmitting data via WiFi. Accordingly, it may be desirable for the first device to communicate with the second device without sacrificing efficient data transmissions that Bluetooth or Bluetooth Low Energy enable. By implementing the intermediary device as a communication bridge, the first device may communicate with the intermediary device via Bluetooth to indirectly communicate with the second device without sacrificing any energy inefficiencies that could be caused by implementing other higher-power communication protocols.

In accordance with at least some aspects, the present disclosure discloses a method for communicating interactive data between heterogeneous devices, comprising: receiving, by an intermediary computing device via a first wireless interface from a first computing device, interactive data from at least one sensor of the first computing device; extracting, by the intermediary computing device, at least one data string from the received interactive data; encapsulating, by the intermediary computing device, the extracted at least one data string in a transport layer header; and transmitting, by the intermediary computing device via a second wireless interface to a second computing device, the encapsulated at least one data string, wherein the second computing device extracts the at least one data string from the encapsulated transmission and forwards the at least one data string to a virtual human interface device (HID) driver executed by an operating system of the second computing device.

In some implementations, the first wireless interface is a Bluetooth wireless interface, and wherein the second wireless interface is a WiFi interface. In further implementations, the received interactive data comprises data from a gyroscope, an accelerometer, a magnetometer, a temperature sensor, a joystick, or a button. In yet further implementations, the first computing device and the second computing device have no direct communications. In some implementations, the method further comprises transmitting, by the intermediary computing device to the first computing device, a request to subscribe to the interactive data from the at least one sensor. In further implementations, the method further comprises establishing, by the intermediary computing device with the second computing device via the second wireless interface, a transport layer communication session. In yet further implementations, extracting the at least one data string further comprises extracting a plurality of concatenated data strings from the received interactive data, by the intermediary computing device, each of the concatenated data strings having a predetermined length.

In accordance with other aspects, the present disclosure discloses a system for communicating interactive data between heterogeneous devices, comprising an intermediary computing device in communication via a first wireless interface with a first computing device and in communication via a second wireless interface with a second computing device, the intermediary computing device comprising a processor having programmed instructions that, when executed, cause the processor to receive, via the first wireless interface from the first computing device, interactive data from at least one sensor of the first computing device;

extract at least one data string from the received interactive data; encapsulate the extracted at least one data string in a transport layer header; and transmit, via the second wireless interface to the second computing device, the encapsulated at least one data string, wherein the second computing device extracts the at least one data string from the encapsulated transmission and forwards the at least one data string to a virtual human interface device (HID) driver executed by an operating system of the second computing device.

In some implementations, the first wireless interface is a Bluetooth wireless interface, and wherein the second wireless interface is a WiFi interface. In further implementations, the received interactive data comprises data from a gyroscope, an accelerometer, a magnetometer, a temperature sensor, a joystick, or a button. In yet further implementations, the first computing device and the second computing device have no direct communications. In some implementations, the programmed instructions, when executed, further cause the processor to transmit, to the first computing device, a request to subscribe to the interactive data from the at least one sensor. In further implementations, the programmed instructions, when executed, further cause the processor to establish, with the second computing device via the second wireless interface, a transport layer communication session. In yet further implementations, wherein the programmed instructions, when executed, further cause the processor to extract a plurality of concatenated data strings from the received interactive data, each of the concatenated data strings having a predetermined length.

In accordance with yet other aspects, the present disclosure discloses a method for communicating interactive data between heterogeneous devices, comprising establishing, by a first computing device with an intermediary computing device, a communication session via a first wireless interface of the intermediary computing device; receiving, by the first computing device from the intermediary computing device via the communication session, a packet comprising sensor data of a second computing device forwarded by the intermediary computing device; the sensor data received by the intermediary computing device via a second wireless interface and encapsulated by the intermediary computing device in the packet; extracting, by the first computing device, the sensor data from the packet; and providing, by the first computing device, the extracted sensor data to a virtual human interface device of the first computing device.

In some implementations, the first wireless interface is WiFi; and wherein the second wireless interface is Bluetooth. In further implementations, the sensor data comprises concatenated data from a plurality of sensors, each of the concatenated data having a predetermined length. In yet further implementations, the first computing device has no direct communication with the second computing device. In some implementations, establishing the communication session comprises executing, by the first computing device, a transport layer server. In further implementations, the sensor data is encapsulated in a transport layer header by the intermediary computing device before transmission to the first computing device.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The details of one or more implementations are set forth in the accompanying drawings and the description below.

Other features, aspects, and advantages of the disclosure will become apparent from the description, the drawings, and the claims, in which:

Figure 1:
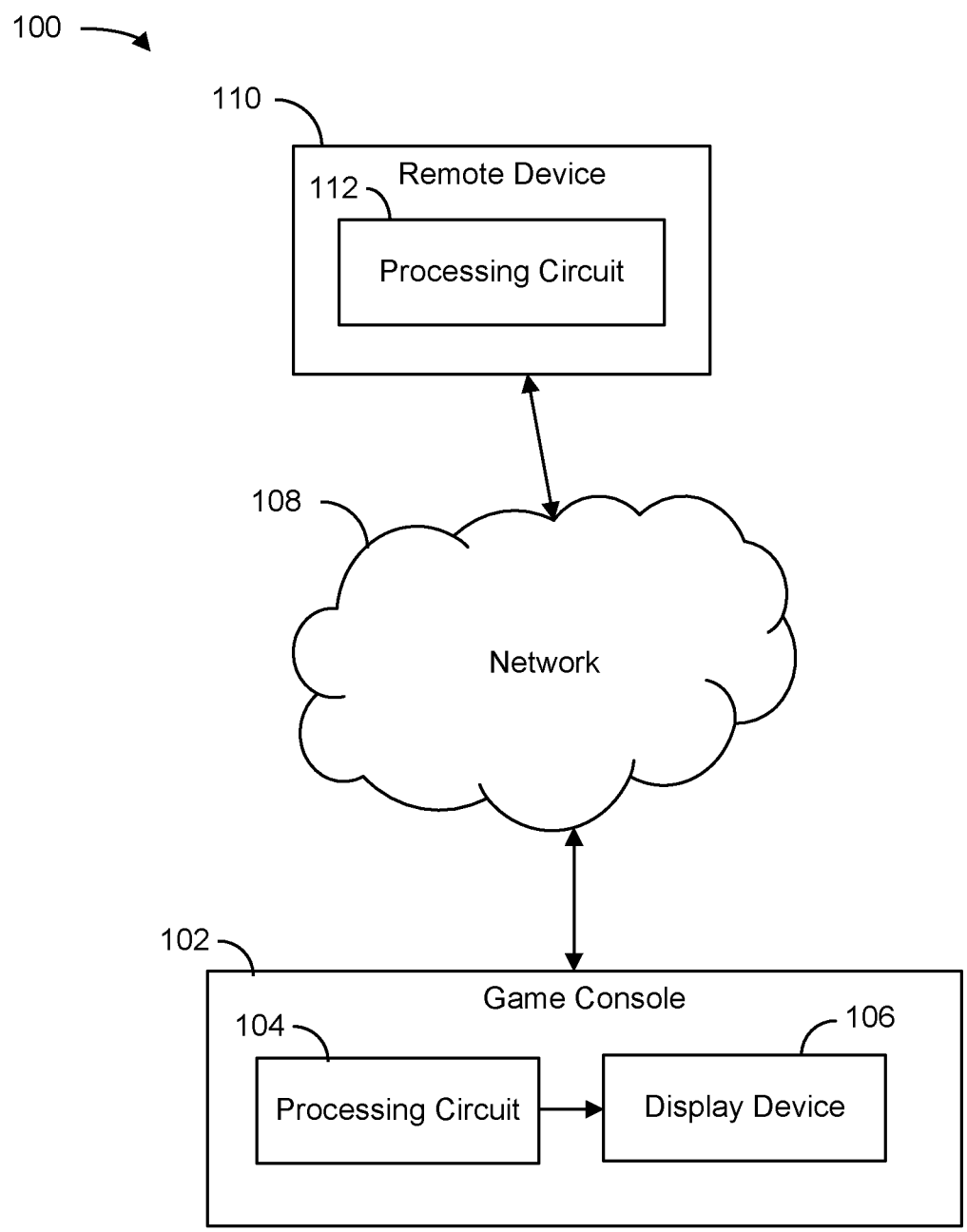
FIG. 1 is a block diagram of a gaming environment, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

In some instances, a first computing device may not have a compatible communication interface with a second computing device. Such devices may be referred to as heterogeneous devices or having heterogeneous communications interfaces, or by similar terms. For example, the first computing device may have been designed to use a low energy communication protocol such as Bluetooth or Bluetooth Low Energy to preserve its battery life during operation. The second computing device may not have been designed with the same constraints because, for example, the second computing device may be connected to a power grid and have a much larger power supply. Consequently, the second computing device may be configured to use WiFi communication protocols but not Bluetooth communication protocols. In some circumstances, it may be desirable for computing devices such as the first computing device and the second device to communicate. For example, a user may wish to use the first computing device as a controller for a game being processed by the second computing device. However, because the first and second computing devices do not have compatible communication interfaces, the user may not be able to do so.

Attempted solutions for enabling devices without compatible communication interfaces to communicate with each other often require extra hardware that forces one of the devices to transmit data via a communication protocol that is compatible with the other device. Such solutions are often expensive or require additional hardware, require port tradeoffs (e.g., a Bluetooth dongle that plugs into a USB port of a computing device takes up a port that could be dedicated to another component), and/or require a device to use more power to transmit data than it otherwise would by using a different communication protocol than it was designed to use. Bluetooth dongles are also frequently small and easy to lose, at which point the system becomes inoperable. By implementing the systems and methods described herein, however, devices with incompatible communication interfaces may communicate with each other without the need to couple extra hardware components to such computing devices while enabling each computing device to communicate efficiently (e.g., minimize the power used to perform such communications). The systems and methods described herein may enable devices without compatible communication interfaces to communicate without requiring either of the computing devices to change the communication protocols with which they communicate.

Implementations of the systems and methods discussed herein provide for improvements in communication between devices without compatible communication interfaces. For example, in some implementations, to enable a first device to communicate with a second device despite the two devices being limited to incompatible communication interfaces, an intermediary device may operate as a communications bridge between the two devices. The intermediary device may communicate with the first device via a first communication protocol and the second device via a second communication protocol.

In an exemplary embodiment, an intermediary device may transmit interactive data that it receives from a first device to a second device for processing. The intermediary device may receive, via a first communication protocol such as Bluetooth or Bluetooth Low Energy, interactive data including data strings with dedicated bits that are associated with different types of interactive data from the first device. The intermediary device may extract data from the data strings and encapsulate the extracted data in a communication layer header of an application that the intermediary device processes. The intermediary server may transmit, via Wifi, the encapsulated data to the second computing device. An agent of the second computing device may receive the encapsulated extracted data and transcode it into HID-compliant data. The agent may insert the transcoded data into an HID-driver that spoofs an HID-compliant device to an operating system of the second device. An application or game being processed by the operating system may identify the transcoded data as an input from an HID-compliant device such as a mouse or keyboard and update a data stream that the application concurrently transmits to the intermediary device for display according to the input. Advantageously, by implementing the intermediary device as a communication bridge, the first device may communicate with the intermediary device via Bluetooth to indirectly communicate with the second device without sacrificing any energy inefficiencies that could be caused by using other communication protocols such as WiFi.

Referring now to FIG. 1, a block diagram of a gaming environment 100 is shown, in accordance with some embodiments of the present disclosure. Gaming environment 100 is shown to include a game console 102, a display device 106, a network 108, and a remote device 110, in some embodiments. As described herein, gaming environment 100 may be a portable gaming system. Game console 102 may communicate with remote device 110 over network 108. Display device 106 may be a part of (e.g., coupled to an exterior component of) game console 102. In some embodiments, display device 106 may be a mobile device (e.g., a cell phone coupled to a housing of game console 102). A processing circuit 104 of game console 102 may communicate with display device 106 to display a user interface at display device 106. Game console 102 may process and display an application or game via processing circuit 104 and display device 106, respectively. As described herein, game console 102 may be a portable gaming device. In brief overview, game console 102 may display a list of games or applications to be played or downloaded on display device 106. An operator may select a game or application from the list by moving game console 102 and pressing an input button of game console 102. Game console 102 may display the selected game or application at display device 106. The operator may control movements and actions of the game or application by maneuvering and/or pressing input buttons of game console 102. Because display device 106 is a part of or is otherwise coupled to game console 102, display device 106 may move with the movements of game console 102. In some embodiments, game console 102 may display movements and/or actions that are associated with applications and/or games that remote device 110 is processing.

Network 108 may include any element or system that enables communication between game console 102 and remote device 110 and their components therein. Network 108 may connect the components through a network interface and/or through various methods of communication, such as, but not limited to, a cellular network, Internet, Wi-Fi, telephone, Lan-connections, Bluetooth, HDMI, or any other network or device that allows devices to communicate with each other. In some instances, network 108 may include servers or processors that facilitate communications between the components of gaming environment 100.

Game console 102 may be a game console including processing circuit 104, which can process various applications and/or games. Game console 102 may include display device 106, which is coupled to an exterior component (e.g., a screen holder) of a housing of game console 102. Processing circuit 104 may display an output of the applications and/or games that game console 102 processes at display device 106 for an operator to view. Game console 102 may also include various push buttons that an operator can press to send a signal to processing circuit 104. The signal may indicate that one of the push buttons was pressed. Each push button may be associated with an action or movement of the application or game that processing circuit 104 is processing. Further, processing circuit 104 may receive inputs from sensors of game console 102 that detect various aspects of movement (e.g., velocity, position, acceleration, etc.) associated with game console 102. Processing circuit 104 may use the inputs from the sensors to affect movements and/or actions associated with the games or applications that processing circuit 104 is processing. Processing circuit 104 may generate and/or update user interfaces associated with the games and/or applications being displayed on display device 106 based on the inputs.

Display device 106 may include a screen (e.g., a display) that displays user interfaces associated with games and/or applications being processed by processing circuit 104. Display device 106 may be coupled to game console 102 via a screen holder (not shown) attached to a game console housing (also not shown) of game console 102. Display device 106 may include a screen display which displays the user interfaces. In some embodiments, display device 106 may include a touchscreen. In some embodiments, display device 106 is a mobile device (e.g., a smartphone, a tablet, etc.), with a processor for processing or executing games or applications.

In some embodiments, display device 106 may display games and/or applications being processed by another device outside of game console 102 (e.g., remote device 110). Remote device 110 may be a device designed to process applications and/or games. Remote device 110 is shown to include a processing circuit 112. Processing circuit 112 may process the games and/or applications and send a user interface to display device 106 to be displayed. Processing circuit 112 may receive and process signals sent from processing circuit 104. Processing circuit 112 may update the user interface being displayed at display device 106 of game console 102 based on the signals from processing circuit 104. Processing circuit 112 may communicate with processing circuit 104 over network 108 via Bluetooth. Further, processing circuit 112 may communicate with display device 106 via an HDMI connection such as a wireless HDMI connection (e.g., HDbitT®, WiFi, HDMI wireless, etc.) or a wired HDMI connection (e.g., HDbaseT®).

Figure 2A:
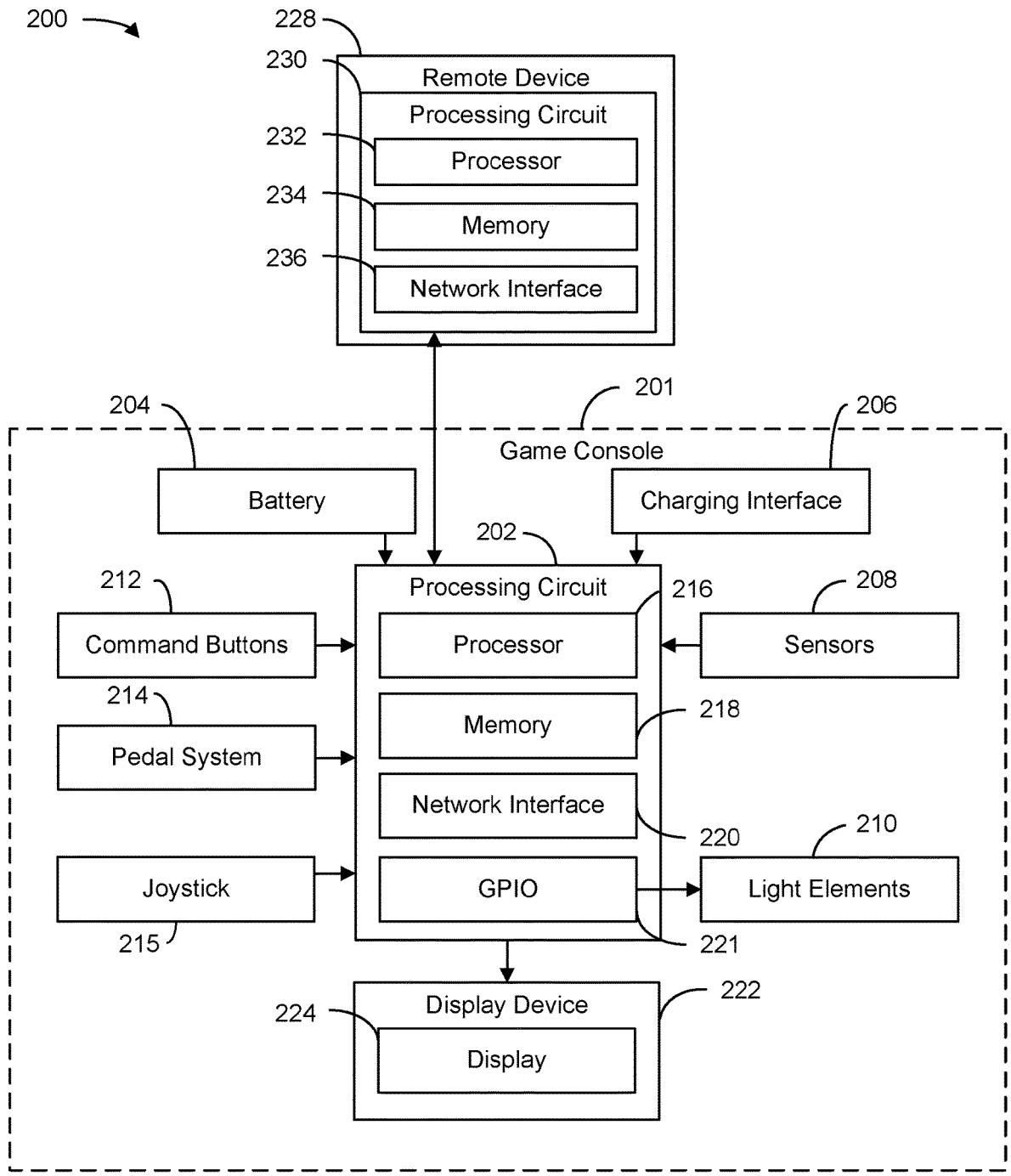
FIG. 2A is a block diagram of an exemplary embodiment of the gaming environment of FIG. 1, in accordance with some embodiments of the present disclosure.

Referring now to FIG. 2A, a block diagram of a gaming environment 200 is shown, in some embodiments. Gaming environment 200 may be an exemplary embodiment of gaming environment 100, shown and described with reference to FIG. 1, in some embodiments. Gaming environment 200 is shown to include a game console 201 and a remote device 228. Game console 201 may be similar to game console 102, shown and described with reference to FIG. 1. Remote device 228 may be similar to remote device 110, shown and described with reference to FIG. 1. Game console 201 is shown to include a processing circuit 202, a battery 204, a charging interface 206, sensors 208, light element(s) 210, command buttons 212, a pedal system 214, joystick 215, and a display device 222. As described above, display device 222 may be coupled to an exterior component (e.g., via a display holder on a barrel) of game console 201. Processing circuit 202 may receive inputs from each of components 204-214, process the inputs, and display and update an output at display device 222 based on the inputs. In some embodiments, processing circuit 202 may additionally or alternatively be a part of display device 222.

Game console 201 may include a battery 204. Battery 204 may represent any power source that can provide power to game console 201. Example of power sources include, but are not limited to, lithium batteries, rechargeable batteries, wall plug-ins to a circuit, etc. Battery 204 may be charged via charging interface 206. For example, battery 204 may be a rechargeable battery. To charge battery 204, an operator may connect game console 201 to a wall outlet via charging interface 206. Once game console 201 has finished charging, the operator may disconnect game console 201 from the wall outlet and operate game console 201 with the power stored in the rechargeable battery. The operator may disconnect game console 201 from the wall outlet at any time to operate game console 201. In some cases, the operator may operate game console 201 while it is connected to the wall outlet. Battery 204 may provide power to processing circuit 202 so processing circuit 202 may operate to process applications and/or games.

For example, as shown in FIG. 2A, processing circuit 202 includes a processor 216, memory 218, a communication device (e.g., a receiver, a transmitter, a transceiver, etc.), shown as network interface 220, and a general purpose input/output (GPIO) unit 221, in some embodiments. Processing circuit 202 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. Processor 216 may include an ASIC, one or more FPGAs, a DSP, circuits containing one or more processing components, circuitry for supporting a microprocessor, a group of processing components, or other suitable electronic processing components. In some embodiments, processor 216 may execute computer code stored in the memory 218 to facilitate the activities described herein. Memory 218 may be any volatile or non-volatile computer-readable storage medium capable of storing data or computer code relating to the activities. According to an exemplary embodiment, memory 218 may include computer code modules (e.g., executable code, object code, source code, script code, machine code, etc.) for execution by processor 216. GPIO unit 221 may include internal circuitry with one or more outputs that enable processor 216 to control and/or power light elements 210 and any other peripheral component. For example, GPIO unit 221 may comprise an input serial interface and convert serial data into signals provided to one or more solid state or analog relays enabling or disabling light elements 210. Such serial data may be obtained from an application executed by processor 216 (e.g. such as a value of a variable representing a player's life or ammunition or other such data), a remote application executed by a remote computing device, or any other component or remote device.

In some embodiments, processing circuit 202 may selectively engage, selectively disengage, control, and/or otherwise communicate with the other components of game console 201. As shown in FIG. 2, network interface 220 may couple processing circuit 202 to display device 222 and/or an external device (e.g., remote device 110). In other embodiments, processing circuit 202 may be coupled to more or fewer components. For example, processing circuit 202 may send and/or receive signals from the components of game console 201 such as light elements 210; charging interface 206; battery 204; command buttons 212 (e.g., a power button, input buttons, a trigger, etc.); one or more sensors, shown as sensors 208; pedal system 214 (including position detectors indicating a position of pedals of pedal system 214); and/or joystick 215 via network interface 220.

Processing circuit 202 may send signals to display device 222 to display a user interface on a display 224 of display device 222 via network interface 220. Network interface 220 may utilize various wired communication protocols and/or short-range wireless communication protocols (e.g., Bluetooth, near field communication ("NFC"), HDMI, RFID, ZigBee, Wi-Fi, etc.) to facilitate communication with the various components of game console 201, including display device 222, and/or remote device 228. In some embodiments, processing circuit 202 may be internally coupled to display device 222 via a tethered HDMI cable located inside a housing of game console 201 that runs between processing circuit 202 and display device 222. In some embodiments, processing circuit 202 may be connected to display device 222 via HDbitT®, which is described below. In some embodiments, processing circuit 202 may be connected to display device 222 via an HDMI low latency wireless transmission technology. Advantageously, by using an HDMI low latency wireless transmission technology, display device 222 may connect to both external devices and to processing circuit 202.

According to an exemplary embodiment, processing circuit 202 may receive inputs from various command buttons 212, pedal system 214, and/or joystick 215 that are located on an exterior surface of game console 201. Examples of command buttons 212 include, but are not limited to, a power button, input buttons, a trigger, etc. Pedal system 214 may include multiple pedals (input buttons) that are coupled to each other so only one pedal may be pressed at a time. In some embodiments, the pedals may be pressed to varying degrees. Processing circuit 202 may receive an input when an operator presses on a pedal of pedal system 214 and identify how much the operator pressed on the pedal based on data detected by sensors coupled to the pedal. Processing circuit 202 may receive the inputs and interpret and implement them to perform an action associated with a game or application that processing circuit 202 is currently processing.

Further, a user may provide an input to processing circuit 202 by maneuvering joystick 215 (e.g., moving the joystick from a first position to a second position). Joystick 215 may be an input device that attaches to game console 201 via one point of contact and pivots around the one point of contact. Joystick 215 may be a 2-axis or 3-axis joystick. Although referred to generally as a joystick, in some implementations, joystick 215 may comprise a directional pad (e.g. 4- or 8-directional pad over a corresponding 4 or 8 contact switches). Joystick 215 may have a resting position at which it does not generate a signal or otherwise generates a signal indicating that it has not been moved. When a user pivots joystick 215, joystick 215 may sense the movement and generate a signal indicating its angle compared to its resting position or game console 201. In some embodiments, joystick 215 may generate a signal indicating a magnitude of its position or its change in position and/or a direction at which it has been moved. In some embodiments, to avoid drift during gameplay, joystick 215 only generates a signal indicating a change in position when a user pivots joystick 215 beyond a threshold amount (e.g. allowing for a "dead zone" or area in which minor manipulation of the joystick or mechanical sagging of the joystick does not trigger a change in position or transmission of a signal). In other embodiments, joystick 215 may generate and/or transmit the signal regardless of whether the user pivoted joystick 215 beyond the threshold amount and processing circuit 202 uses a similar threshold to determine whether to use the joystick signal to update a user interface or to otherwise determine a weight to give the joystick signal when aggregating the joystick signal with a position sensor signal.

In some embodiments, joystick 215 may be depressible or incorporate a contact switch activated by pressing on the joystick. A user may press joystick 215 and joystick 215 may consequently transmit a signal to processing circuit 202 indicating that joystick 215 has been pressed. In some embodiments, the signal indicating that joystick 215 has been pressed may correspond to a predetermined command. The predetermined command may be individually associated with a game or application. For example, in a first-person shooting game, a user may press on joystick 215 to crouch or zoom in on a scope, in some embodiments. Pressing on joystick 215 may be associated with any predetermined command. In some embodiments, pressing on joystick 215 may cause weights that are associated with a joystick signal or a position sensor signal to adjust, as described below. Pressing on joystick 215 may cause the weights to adjust based on a change in the user interface, a change in state of a game or application being executed, or otherwise based solely on the joystick being pressed.

In some embodiments, processing circuit 202 may combine signals from sensors 208 and joystick 215 to update a display (e.g., a user interface) of display 224. Processing circuit 202 may combine the signal from sensors 208 and joystick 215 by assigning weights to each signal and aggregating, averaging, or performing some other operation or combination of operations on the weighted signals. For example, processing circuit 202 may determine that a joystick signal has a smaller weight than a position sensor signal so joystick 215 may be used for fine control of a user interface while a user may re-orient game console 201 for larger user interface adjustments. For instance, when a user is playing a first-person shooter game, the user may reorient game console 201 to scan a three-dimensional virtual environment and use joystick 215 to hone in a target within the three-dimensional virtual environment.

Processing circuit 202 may change a display (e.g., a user interface) of display 224 based on the inputs. The inputs from the input buttons, the trigger, and/or the pedal system may be an indication that the operator of game console 201 desires that their character in a game jumps, crouches, dives/slides, throws a knife, throws a grenade, switches weapons, shoots a weapon, moves backward, moves forward, walks, jogs, runs, sprints, etc. The inputs from the input buttons, the trigger, and/or the pedal system may additionally or alternatively be an indication that the operator of game console 201 desires to perform various different actions while in menus of the game such as scroll up, scroll down, and/or make a menu selection (e.g., select a map, select a character, select a weapon or weapons package, select a game type, etc.). In this way, an operator may utilize game console 201 as a mouse or roller ball that can move a cursor on display 224 to select an option that display 224 displays. Inputs from the power button may be an indication that the operator of game console 201 desires that game console 201 be turned on or off.

In some embodiments, an operator may calibrate game console 201 to adjust a rate of change of views of display 224 versus movement that sensors 208 detects. For example, game console 201 may be configured to change views of display 224 at a same rate that an operator moves game console 201. The operator may wish for the views to change at a slower rate. Accordingly, the operator may adjust the settings of game console 201 so display 224 changes views slower than the operator moves game console 201.

In some embodiments, an operator may calibrate game console 201 based on the actions being performed on a user interface. For example, an operator may calibrate game console 201 so the user interface changes at the same rate that the operator moves game console 201 when playing a game. Within the same configuration, the operator may also calibrate game console 201 so the operator can maneuver a cursor at a faster rate than the operator moves game console 201 when selecting from a drop down menu or from other types of menus or option interfaces.

In some embodiments, processing circuit 202 may receive an indication regarding a characteristic within a game (e.g., a health status of a character of the game) operated by game console 201 and control light elements 210 of a light bar (not shown) to provide a visual indication of the characteristic within the game operated by game console 201. For example, processing circuit 202 may receive an indication regarding a health status of a character within the game that is associated with the operator of game console 201 and control light elements 210 (e.g., selectively illuminate one or more of light elements 210, etc.) to provide a visual indication of the character's health via the light bar. By way of another example, processing circuit 202 may receive an indication regarding a number of lives remaining for a character within the game that is associated with the operator of game console 201 and control light elements 210 (e.g., selectively illuminate one or more of light elements 210, etc.) to provide a visual indication of the number of remaining lives via the light bar. In another example, processing circuit 202 may receive an indication regarding a hazard or event within the game (e.g., radiation, warning, danger, boss level, level up, etc.) and control light elements 210 to change to a designated color (e.g., green, red, blue, etc.) or to flash to provide a visual indication of the type of hazard or event within the game via the light bar.

In some embodiments, processing circuit 202 may receive inputs from sensors 208 of game console 201. Sensors 208 may include an accelerometer, a gyroscope, and/or other suitable motion sensors or position sensors that detect the spatial orientation and/or movement of game console 201 (e.g., a magnetometer). The accelerometer and gyroscope may be a component of an inertial measurement unit (not shown). The inertial measurement unit may include any number of accelerometers, gyroscopes, and/or magnetometers to detect the spatial orientation and/or movement of game console 201. The inertial measurement unit (IMU) may detect the spatial orientation and/or movement of game console 201 by detecting the spatial orientation and/or movement of a game console housing (not shown) of game console 201. The IMU may transmit data identifying the spatial orientation and/or movement of game console 201 to processing circuit 202. Based on signals received from sensors 208, processing circuit 202 may adjust the display provided by display 224 of display device 222. For example, sensors 208 may detect when game console 201 is pointed up, pointed down, turned to the left, turned to the right, etc. Processing circuit 202 may adaptively adjust the display on display 224 to correspond with the movement of game console 201.

In some embodiments, game console 201 may include speakers (not shown). Processing circuit 202 may transmit audio signals to the speakers corresponding to inputs that processing circuit 202 processes while processing a game and/or application. The audio signals may be associated with the game or application. For example, an operator may be playing a shooting game that processing circuit 202 processes. The operator may pull the trigger of game console 201 to fire a gun of the shooting game. Processing circuit 202 may transmit a signal to the speakers to emit a sound associated with a gun firing.

In some embodiments, game console 201 may be used as a mouse and/or keyboard to interact with various dropdown menus and selection lists being displayed via display device 222. In some cases, the various dropdown menus and selection lists may be related to an online exchange that allows operators to select a game or application to download into memory 218 of processing circuit 202. The operators may select the game or application by reorienting game console 201 to move a cursor that display device 222 is displaying on a user interface including dropdown menus and/or selection lists. Sensors 208 of game console 201 may detect the movements of game console 201 and send signals to processing circuit 202 that are indicative of the movements including at least movement direction and/or speed. Processing circuit 202 may receive and process the signals to determine how to move the cursor that display device 222 is displaying. Processing circuit 202 may move the cursor corresponding to the movement of the game console 201. For example, in some instances, if an operator points game console 201 upward, processing circuit 202 may move the cursor upwards. If an operator points game console 201 downward, processing circuit 202 may move the cursor downwards. The operator may configure game console 201 to invert the movements or change the movements in any manner to affect the movement of the cursor. In some embodiments, processing circuit 202 may receive inputs that correspond to the movement and the speed of the movement of game console 201 based on the movement of an end of the barrel of game console 201.

In some embodiments, game console 201 may include a calibrated floor position that movements of game console 201 may be detected against. An administrator may calibrate the floor position by setting a base position of the gyroscopes of game console 201 that are associated with a pitch of game console 201. The pitch of game console 201 may be determined based on the position of game console 201 relative to the calibrated floor position. For example, an administrator may calibrate a floor position of game console 201 to be when game console 201 is positioned parallel with the ground. The administrator may position and/or determine when game console 201 is parallel with the ground and set the gyroscope readings associated with the pitch of the position as a calibrated floor position. If the gyroscopes detect that game console 201 is pointing at a position above the calibrated floor position, the gyroscopes may send data indicating the position of game console 201 as pointing up and/or a degree of how far up game console 201 is pointing relative to the calibrated floor position to processing circuit 202.

In some embodiments, the gyroscopes may send position data to processing circuit 202 and processing circuit 202 may determine the position of game console 201 compared to the calibrated floor position. Consequently, processing circuit 202 may determine a pitch position of game console 201 relative to a consistent fixed pitch position instead of relative to a starting pitch position of game console 201 upon start-up of a game or application. Advantageously, an administrator may only set a calibrated floor position for the pitch of game console 201. Processing circuit 202 may determine and set a calibrated yaw position of game console 201 upon boot up or upon starting processing of a game or application. A user playing the game or application may adjust the calibrated floor position and/or calibrated yaw position by accessing the settings associated with the game, application, or game console 201.

The gyroscopic data may include pitch, yaw, and/or roll of game console 201. The pitch may correspond to the barrel of game console 201 moving up or down and/or a position on a y-axis (e.g., a y-axis tilt of game console 201). The yaw may correspond to the barrel of game console 201 moving side-to-side and/or a position on an x-axis (e.g., an x-axis tilt of game console 201). The roll may correspond to the barrel rotating clockwise or counterclockwise around a z-axis. The y-axis may point from the ground to the sky, the x-axis may be perpendicular to the y-axis, and the z-axis may be an axis extending from an end (e.g., the barrel or the handle) of game console 201. Gyroscopes of the IMU may be positioned to detect the pitch, yaw, and/or roll of game console 201 as gyroscopic data along with a direction of each of these components. The gyroscopes may transmit the gyroscopic data to processing circuit 202 to indicate how game console 201 is moving and/or rotating.

Processing circuit 202 may move a cursor on a user interface by analyzing gyroscopic data that gyroscopes of game console 201 send to processing circuit 202 along with other positional data (e.g., acceleration data from accelerometers). Processing circuit 202 may process the gyroscopic data to convert it into mouse data. Based on the mouse data, processing circuit 202 can move a cursor on the user interface accordingly. For example, if a detected pitch indicates game console 201 is pointing up, processing circuit 202 may move a cursor up. If a detected yaw indicates game console 201 is pointing left, processing circuit 202 may move the cursor left. Consequently, the combination of processing circuit 202 and the gyroscopes can act as an HID-compliant mouse that can detect a movement of game console 201 and move a cursor of a user interface corresponding to the movement. Further, processing circuit 202 may send such gyroscopic data to another device (e.g., remote device 228) for similar processing. Advantageously, by acting as an HID-compliant mouse, game console 201 can move cursors associated with various games and application according to a set standard. Game and application manufacturers may not need to create their games or applications to specifically operate on processing circuit 202.

Processing circuit 202 may also use gyroscopic data (in combination with other data such as data from one or more accelerometers) of game console 201 to act as an HID-compliant joystick. When processing a game with a user interface emulating a view of a person in a three-dimensional environment, processing circuit 202 may receive gyroscopic data associated with the pitch, yaw, and/or roll of game console 201 compared to a calibrated floor position as described above. Processing circuit 202 may convert the gyroscopic data and accelerometer data to HID-compliant joystick data associated with a direction and acceleration of movement of game console 201. Based on the direction and acceleration, processing circuit 202 may update the user interface.

For example, processing circuit 202 may process a three-dimensional environment of a game or application. Processing circuit 202 may receive gyroscopic data indicating that game console 201 is pointing up relative to a calibrated pitch position and convert the data to HID-compliant joystick data. Based on the HID-compliant joystick data, processing circuit 202 may update the user interface to cause a character of the game or application to look up in the three-dimensional environment (e.g., reorient the screen to look up in the three-dimensional environment) or move a cursor up in the three-dimensional environment. Processing circuit 202 may also receive gyroscopic data indicating a roll of game console 201. A roll may correspond to an action in a game or application. For example, an operator may roll game console 201 to peak around a corner in a game.

Various positions of game console 201 may correspond to actions in a game. For example, gyroscopic data may indicate that game console 201 is pointing down. Such a movement may be associated with reloading in a game. Processing circuit 202 may receive this data, convert the data to HID-compliant joystick data, and update the user interface so a reload animation is performed. Game console 201 may associate various motion gestures with various actions depending on the game or application that game console 201 is processing.

In some embodiments, display device 222 may operate as a digital keyboard. Display device 222 may present a digital keyboard at display 224 and an operator may interact with the digital keyboard to select various keys. The operator may select various keys by moving a cursor as discussed above and pressing a button or pulling the trigger of game console 201. In some embodiments, display device 222 may include a touchscreen. In these embodiments, an operator may physically touch an electronic representation of each key on display 224 of display device 222 to select keys of the digital keyboard.

In some embodiments, game console 201 may generate a virtual environment for an operator to view. Game console 201 may generate the virtual environment based on a game or application that processing circuit 202 processes. Processing circuit 202 may generate the virtual environment by processing software associated with the game or application. The virtual environment may be a three-dimensional environment that an operator can interact with by providing various inputs into game console 201. A portion of the virtual environment may be displayed by display device 222. An operator that is operating game console 201 may change the portion of the virtual environment being displayed by display device 222 by providing an input into game console 201. Processing circuit 202 may receive the input and update the display of display device 222 based on the input. In some embodiments, processing circuit 202 can continue to generate and update views of the virtual environment that are not currently being displayed by display device 222. Advantageously, by continuing to generate and update portions of the environment that are not currently being shown by display device 222, if the operator provides an input to cause the display to change to another view of the environment, processing circuit 202 may not need to generate a new view responsive to the input. Instead, processing circuit 202 can display a view that processing circuit 202 has already generated. Consequently, processing circuit 202 may process the virtual environment faster after initially generating the virtual environment.

For example, an operator may be playing a war game simulator on game console 201. Processing circuit 202 of game console 201 may generate a three-dimensional battlefield associated with the war game. The three-dimensional battlefield may include terrain (e.g., bunkers, hills, tunnels, etc.) and various characters that interact with each other on the battlefield. The operator playing the war game can view a portion of the battlefield through display device 222. The portion of the battlefield may be representative of what a person would see if the battlefield was real and the person was on the battlefield. The operator may change views (e.g., change from a first view to a second view) of the battlefield by reorienting game console 201. For instance, if the operator spins 360 degrees, processing circuit 202 could display a 360-degree view of the battlefield on display device 222 as the operator spins. If the operator pulls the trigger of game console 201, a sequence associated with firing a gun may be displayed at display device 222. Further, if the operator presses on a pedal of pedal system 214, a character representation of the operator may move forward or backwards in the battlefield corresponding to the pedal that was pressed. Other examples of interactions may include the operator pressing an input button to select an item (e.g., a medical pack) on the battlefield, the operator pressing a second input button to reload, the operator pressing a third input button to bring up an inventory screen, etc. As described, by pressing an input button, the operator may change the state of the input button from an unpressed state to a pressed state. Similarly, by pulling the trigger, an operator may change the state of the trigger from an unpulled state to a pulled state. Further, a detected change in position of game console 201 may be described as a change in state of the position of game console 201.

Various buttons (e.g., command buttons 212) may map to different actions or interactions of games that processing circuit 202 processes. Different games may be associated with different button mappings. Further, the mappings may be customizable so an operator can control actions that each button is associated with. For example, a button in one game may be associated with a "jump" movement in the game. In another game, the same button may be associated with a "sprint" movement while another button of the various buttons may associated with the jump movement.

In some embodiments, the various buttons may each be associated with a letter or button on a keyboard displayed on a user interface. An operator may customize the buttons to be associated with different letters based on the operator's preferences. A keyboard may be displayed on display 224 and the operator may select keys of the keyboard using the various push buttons.

In some embodiments, game console 201 may operate as an input and display device for an external gaming device (e.g., remote device 228). For example, remote device 228 of gaming environment 200 may be in communication with processing circuit 202 of game console 201. Remote device 228 may include a processing circuit 230 having a processor 232, memory 234, and a network interface 236. Processing circuit 230, processor 232, memory 234, and network interface 236 may be similar to processing circuit 202, processor 216, memory 218, and network interface 220 of game console 201, respectively. In some cases, remote device 228 may include a plug-in that facilitates transmission of an HDMI output (e.g., an audiovisual data stream generated by processing circuit 230) to display device 222 or to processing circuit 202 to forward to display device 222. In some cases, remote device 228 may transmit audio data that corresponds to visual data that remote device 228 transmits. Consequently, remote device 228 may transmit audiovisual data streams to game console 201 to display at display device 222.

In some embodiments, processing circuit 202 of game console 201 may be or may include a Bluetooth processor including various Bluetooth chipsets. The Bluetooth processor may receive inputs from various components of game console 201, and send the inputs to processing circuit 230 for processing. Advantageously, Bluetooth processors may be physically smaller and require less processing power and/or memory than other processors because the Bluetooth processors may not need to process applications or games or produce an audiovisual data stream to display at display device 222. Instead, the Bluetooth processor may only receive and package inputs based on operator interactions with game console 201 and transmit the inputs to remote device 228 for processing. In addition to Bluetooth, other wireless protocols may utilized to transmit inputs to remote device 228. For example, processing circuit 202 may transmit the inputs to remote device 228 through infrared signals. The inputs may be transmitted through any type of wireless transmission technology.

In some embodiments, remote device 228 may transmit an HDMI output to display device 222 using HDbitT® technology. HDbitT® may enable transmission of 4K Ultra HD video, audio, Ethernet, power over Ethernet, various controls (e.g., RS232, IR, etc.) and various other digital signals over wired and/or wireless communication mediums. For example, HDbitT® may enable data transmission via UTP/STP Cat5/6/7, optical fiber cables, power lines, coaxial cables, and/or wireless transmission. Remote device 228 may receive inputs from game console 201 (e.g., via Bluetooth), process the inputs based on a game or application that remote device 228 is currently processing, and transmit an updated HDMI output (e.g., an updated audiovisual datastream) to display device 222 using HDbitT® technology. Advantageously, by using HDbitT® to transmit data streams, remote device 228 may wirelessly transmit high definition audiovisual data signals to display device 222 for users that are using game console 201 to view. HDbitT® may allow for remote device 228 to transmit high definition audiovisual data signals over large distances so users can use game console 201 far away from remote device 228 (e.g., 200 meters) or between rooms in a house. For example, operators may use game console 201 in various rooms of a house without moving remote device 228 between the rooms.

Remote device 228 may process games and/or applications. Remote device 228 may generate a user interface associated with the games or applications and send the user interface to processing circuit 202 or directly to display device 222. If remote device 228 sends the user interface to display device 222, display device 222 may display the user interface at display 224 and play any audio that remote device 228 sent to display device 222 via an audio component (e.g., one or more speakers) of game console 201. In some embodiments, a speaker of remote device 228 may play the audio via speakers connected to remote device 228 (e.g., speakers on a television connected to remote device 228).

In some instances, an operator operating game console 201 may view the user interface that remote device 228 generated and sent to display device 222. The operator may interact with the user interface by pressing input buttons (e.g., command buttons 212, pedal system 214, a trigger, etc.) of game console 201 or reorienting game console 201. Processing circuit 202 can receive the input signals generated from either action and transmit (e.g., forward) the inputs to processing circuit 230 of remote device 228. Processing circuit 202 may transmit the input signals to processing circuit 230 via Bluetooth, as described above. Remote device 228 may receive and process the input signals. Remote device 228 can consequently provide an updated user interface (e.g., an updated data stream that adjusts the user interface currently being displayed at display device 222) to game console 201 (e.g., via HDbitT®). Remote device 228 may either send the updated user interface directly to display device 222 to update the display of display 224 or to processing circuit 202 for processing circuit 202 to update the display. Advantageously, as described, game console 201 can connect to remote device 228 to display games and/or applications designed for remote device 228. Game console 201 can display the game or application on display device 222. An operator accessing game console 201 may play the games or applications by providing inputs via game console 201. Processing circuit 230 of remote device 228 may perform the processing functions of the games or applications so processing circuit 202 of game console 201 may not need to perform such functions or have the capability (e.g., processing power and/or memory requirements) to do so.

Figure 2B:
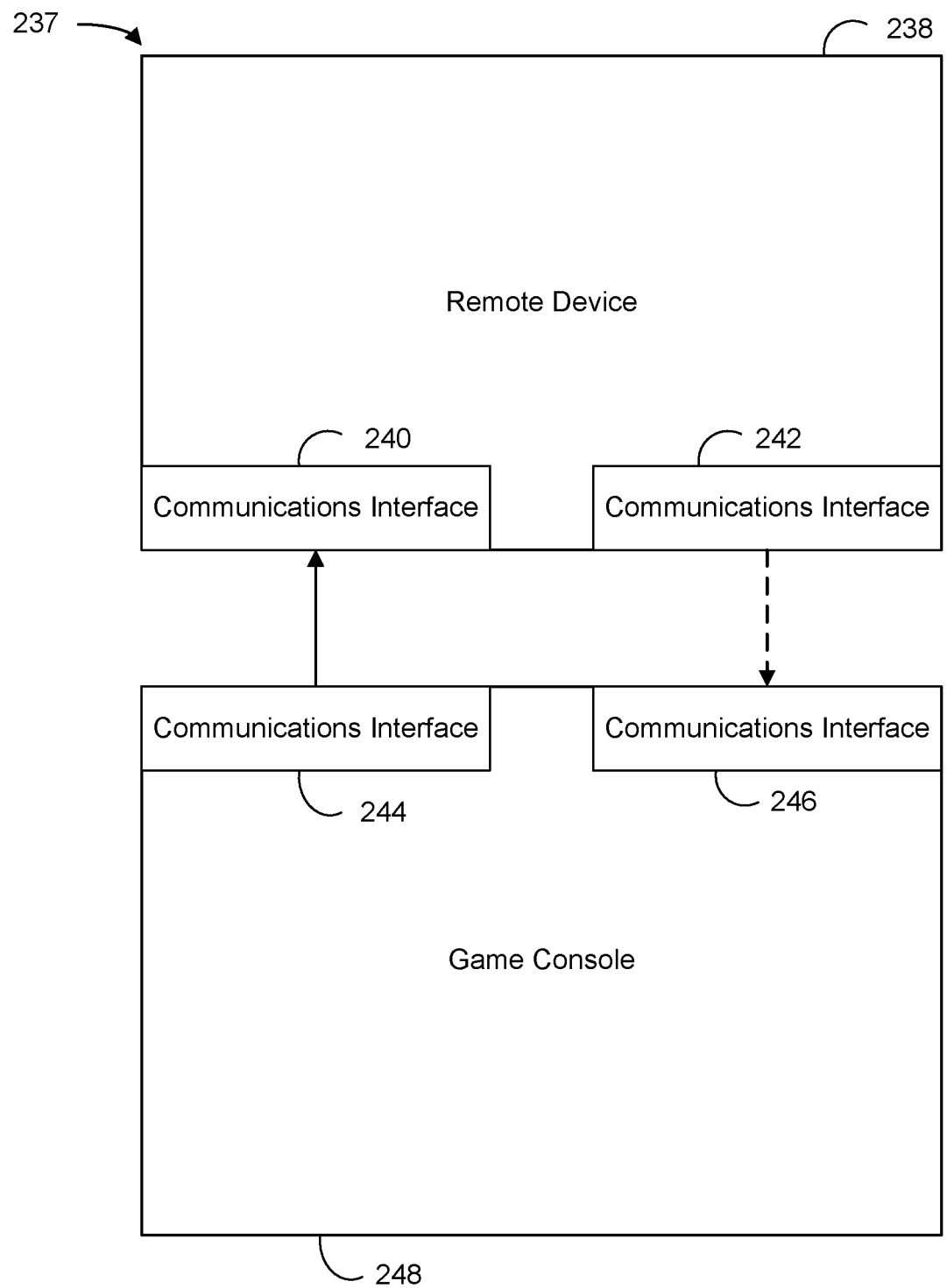
FIG. 2B is a block diagram of an exemplary embodiment of a game console in communication with a remote device via different communication interfaces, in accordance with some embodiments of the present disclosure.

FIG. 2B is a block diagram of an exemplary embodiment of a game console 248 in communication with a remote device 238 via different communication interfaces, in accordance with some embodiments of the present disclosure. Game console 248 may be similar to game console 201 and remote device 238 may be similar to remote device 228, both shown and described with reference to FIG. 2A. Game console 248 is shown to include a communication interface 244 and a communication interface 246. Remote device 238 is shown to include a communication interface 240 and a communication interface 242. In some embodiments, communication interfaces 244 and 246 may be a part of network interface 220 and communication interfaces 240 and 242 may be a part of network interface 236, both shown and described with reference to FIG. 2A. Communication interface 244 of game console 248 may generate and transmit input signals to communication interface 240. Examples of input signals may be signals generated resulting from a user pressing a push button, moving a joystick, pulling a trigger, pushing on a pedal, reorienting game console 248, or any other signal that may be generated resulting from a user action. Communication interface 244 may send the signal over Bluetooth, infrared, over a wired connection, or over any wireless LAN scheme in conformity with an IEEE 802.11 standard (e.g. 802.11a/b/g/n/ax/etc.). In some embodiments, communication interface 244 may utilize a lossless transport layer communication protocol to transmit such signals. The communication interface 244 may do so to ensure that the correct signals are being transmitted between the game console and the remote device. Correct signals may be important when transmitting inputs as any errors would prove to be frustrating to the user. For example, a user may not want to move a joystick in one direction while remote device 238 updates the user interface to move in the opposite direction. While lossless communications protocols require extra overhead for error correction, retransmissions, etc., control signals may be relatively low bandwidth and thus may still be transmitted quickly and with low effective latency. Communication interface 244 may transmit the input signal to communication interface 240 of remote device 238.

Remote device 238 may process the input signal from communication interface 244 according to the application or game that remote device 238 is executing. Remote device 238 may generate an updated audiovisual data stream (e.g., a media stream) based on the signal from communication interface 244 and transmit the updated audiovisual data stream to game console 248 through communication interface 242. Communication interface 242 may utilize WiFi, HdBitT®, HdBaseT®, a wired connection, or any wireless LAN scheme in conformity with an IEEE 802.11 standard to transmit the audiovisual data stream to game console 248. Communication interface 242 may transmit the audiovisual data stream to game console 248 using a different communication protocol than the communication protocol that communication interface 244 uses to transmit input data to remote device 238. In some embodiments, communication interface 242 may utilize a lossy transport layer communication protocol to transmit the audiovisual data to game console 248 to update a user interface. Audiovisual data may be both high-bandwidth (e.g. for high resolution images at very high numbers of frames per second, for example) and time-sensitive (e.g. where delays or lag may result in visuals becoming temporally unassociated with commands or controls, such that the view doesn't rotate with the player, actions are not shown until after a delay, etc.). Communication interface 242 may utilize a lossy transport layer communication protocol to ensure that a large file size that may accommodate audiovisual data may be transmitted to game console 248 quickly to update the user interface of game console 248.

Figure 2C:
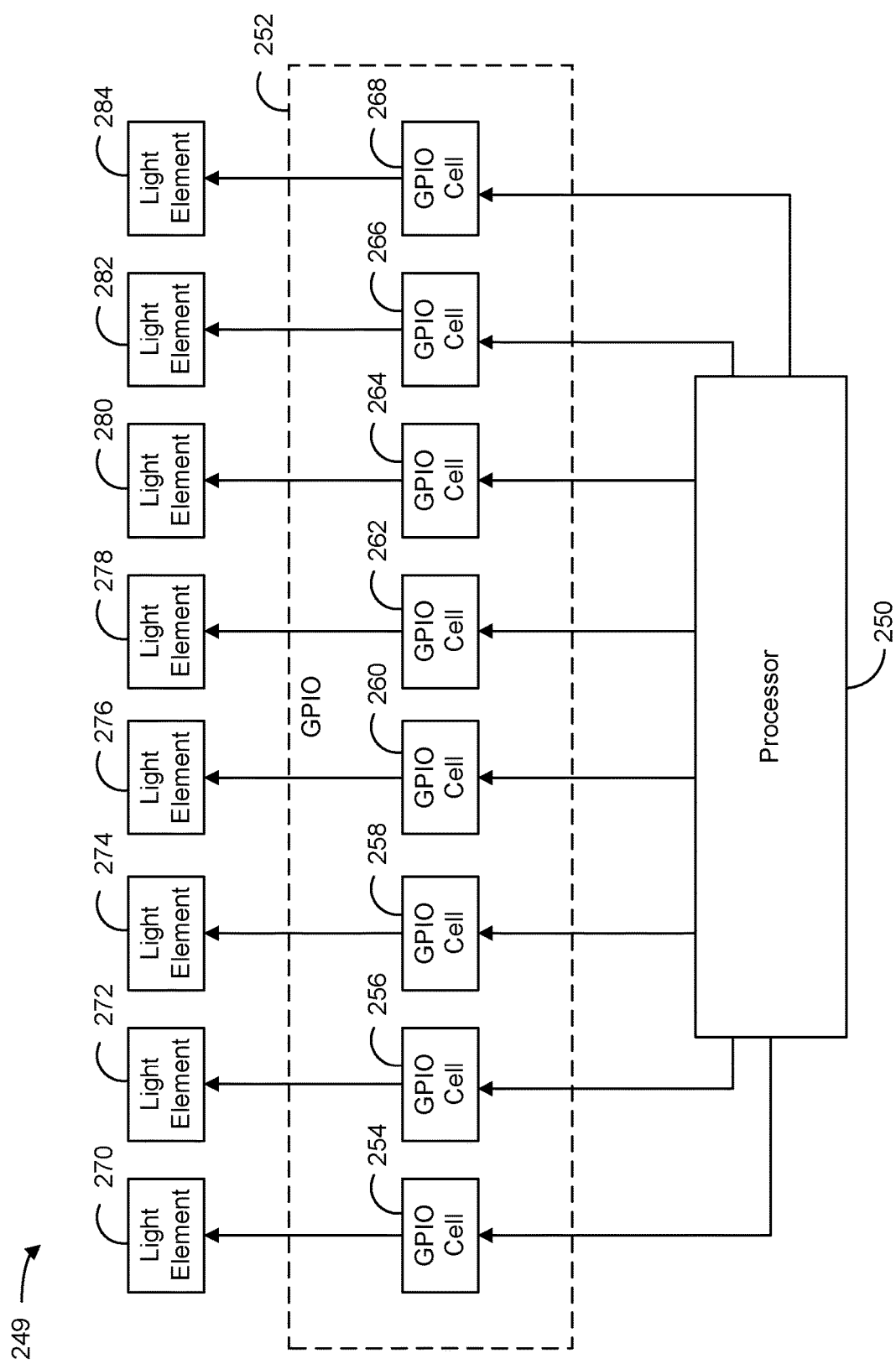
FIG. 2C is a block diagram of an exemplary embodiment of a processor in communication with a general purpose input/output (GPIO) unit to control light elements, in accordance with some embodiments of the present disclosure.

FIG. 2C is a block diagram of an exemplary embodiment of a processor 250 in communication with a general purpose input/output (GPIO) unit 252 to control light elements 270-284, in accordance with some embodiments of the present disclosure. Processor 250 may be similar to processor 216, shown and described with reference to FIG. 2A. GPIO unit 525 may be similar to GPIO unit 221, shown and described with reference to FIG. 2A. GPIO unit 252 may include GPIO cells 254-268. GPIO unit 252 may include more or less GPIO cells 254-268 depending on its configuration. Processor 250 is shown to be connected to each of GPIO cells 254-268. However, processor 250 may be connected to more or fewer of GPIO cells. Further, each of GPIO cells 254-268 may be connected to one or more light elements. GPIO cells 254-268 may be connected to other components of a blaster or may not be connected to any component. Light elements 270-284 may be similar to light elements 210, shown and described with reference to FIG. 2.

Processor 250 may control each or a portion of light elements 270-284 based on an application or game that processor 250 is processing. For example, processor 250 may cause all of light elements 270-284 to light up if the health of an in-game character is high or only a few of light elements 270-284 to light up if the health of the in-game character is low. In another example, a portion of light elements 270-284 may flash to represent that the in-game character got shot or was otherwise contacted. In yet another example, a portion of light elements 270-284 may light up to indicate an amount of ammo that an-game character has. In yet another example, a portion of light elements 270-284 may light up to indicate an in-game action such as a character talking, running, jumping, picking up an item, etc. In some embodiments, light elements 270-284 may light up to be different colors depending on the action and what light elements 270-284 represent in-game. For example, light elements 270-284 may light up to be red to represent health and light up white to represent ammo in the same game. In some embodiments, an operator could toggle between the colors to view different aspects of the game. Processor 250 may cause light elements 270-284 to light up in sequence (e.g., light elements 270-284 may light up next to each other until all of light elements 270-284 are lit) to indicate an aspect of a game or application being processed. Light elements 270-284 may light up in any order and in any pattern.

To control or light up light elements 270-284, processor 250 may transmit one or more signals to one or more of GPIO cells 254-268. A GPIO cell represents an input node and internal logic of GPIO unit 252 that is performed on any input received at the input node. In some embodiments, a GPIO cell represents an input node for receiving a signal from processor 250 and an output node for lighting up or otherwise powering one or more light elements. A GPIO cell may receive a signal from processor 250 and accordingly light up any of light elements 270-284. If more current is necessary to light up a light element, a GPIO cell may provide a signal to a driver to provide such current. In some embodiments, a GPIO cell may be configured to receive more than one signal from processor 250. In such embodiments, the GPIO cell may perform various processes to light up one or more lights elements based on a combination of the signals.

For example, processor 250 may identify a light pattern that corresponds to an in-game characteristic such as an amount of health that a character within the game has. Processor 250 may identify the light pattern from a database based on the in-game characteristic. Processor 250 may send a signal to one or more of GPIO cells 254-268 indicating the light pattern and one or more of the GPIO cells may light up a portion of light elements 270-284 according to the light pattern. Processor 250 may send any light pattern to GPIO cells 254-268.

Figure 3:
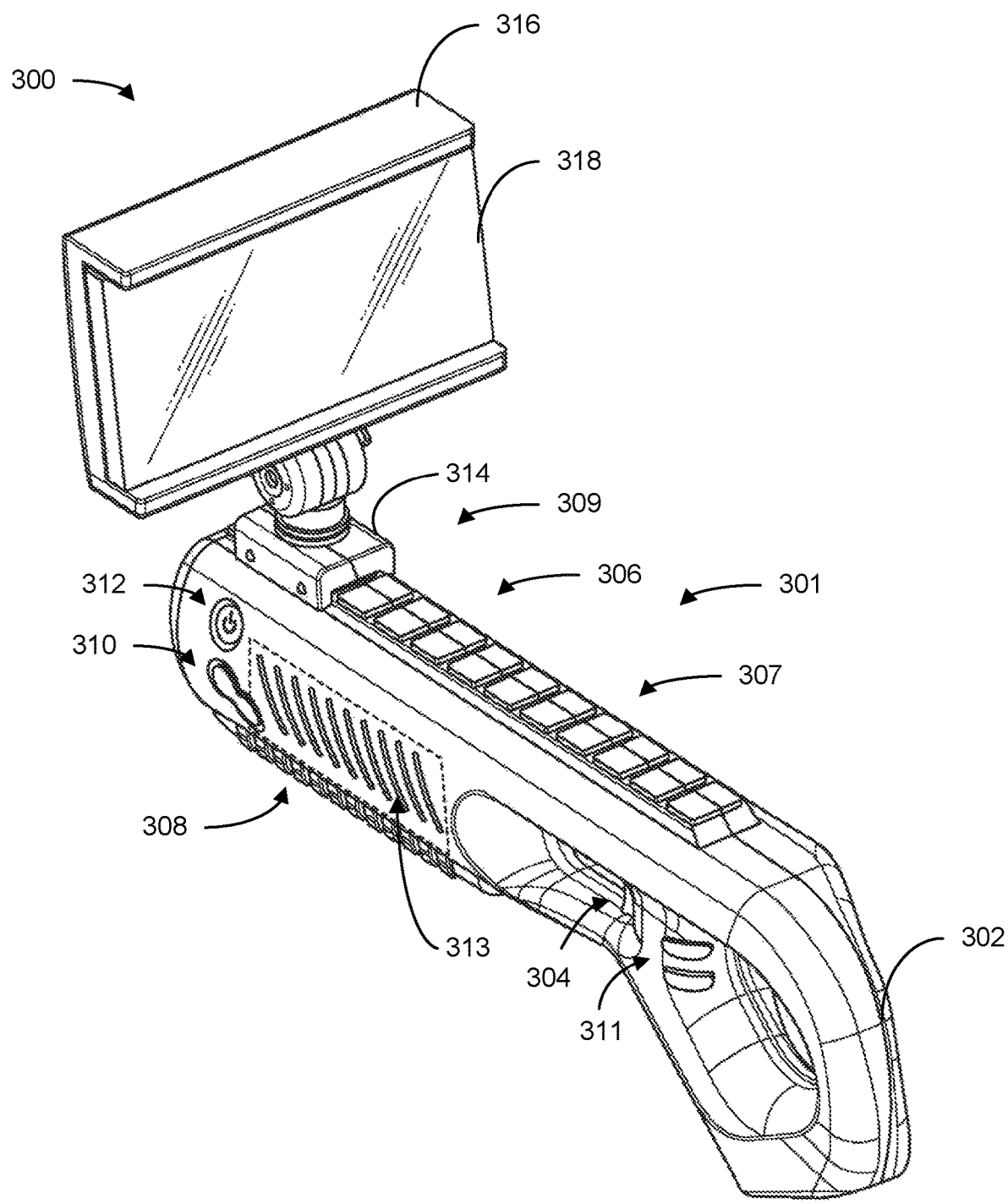
FIG. 3 is a perspective view of a game console including a display device coupled to a game console housing of the game console, in accordance with some embodiments of the present disclosure.

Referring now to FIG. 3, a perspective view of a game console 300 including a display device 316 coupled to a game console housing 301 via a screen holder 314 (e.g., an adjustable clamp or a component this a part of game console housing 301) is shown, in accordance with some embodiments of the present disclosure. Game console 300 may be similar to and include similar components to game console 201, shown and described with reference to FIG. 2. Display device 316 may be similar to display device 222, shown and described with reference to FIG. 2. Game console housing 301 is shown to include a grip portion 302, a trigger 304, an elongated portion 306 (e.g., a barrel), latches 307, a grip 308, command buttons 310 and 311, a power button 312, and light elements 313. Game console housing 301 may be made out of plastic, metal, wood, glass, or any other type of material. Game console housing 301 may be shaped to resemble a blaster device (e.g., a rifle, a shotgun, a machine gun, a grenade launcher, a rocket launcher, etc.). Elongated portion 306 may be shaped to resemble a barrel of such a blaster device (e.g., elongated portion 306 may be shaped like a tube and extend away from grip portion 302 and trigger 304). Screen holder 314 may be coupled to elongated portion 306 such that an operator holding game console 300 may view display device 316, which is attached to screen holder 314, when the operator is holding game console 300. Screen holder 314 may be coupled to a top of elongated portion 306. It should be understood that the positions and number of handles, triggers, barrels, latches, grips, command buttons, and light elements as shown and described with reference to FIG. 3 are meant to be exemplary. Game console housing 301 may include any number of handles, triggers, barrels, latches, grips, command buttons, and/or light elements and they can be in any position and in any size or orientation on game console housing 301. Further, screen holder 314 and display device 316 may be any shape or size and coupled to any component of game console housing 301 and are not meant to be limited by this disclosure.

Grip portion 302 may be a handle by which a user may grasp game console housing, and may comprise a portion extending orthogonally or at an angle from elongated portion 306 (e.g. downwards, when elongated portion 306 is horizontal). Grip portion 302 may be configured so the user can grasp game console housing 301 by wrapping the user's fingers around grip portion 302 until the fingers begin to point back at the user. For example, an operator may grasp grip portion 302 by forming a "U"-shape with their hand with grip portion 302 forced against the operator's fingers. Further, grip portion 302 may be configured so an operator may pull trigger 304 positioned away from the operator with the operator's index finger by pulling the operator's index finger towards the operator. Accordingly, grip portion 302 creates a handle that a user may hold similar to how the user would hold a blaster.

Figure 11:
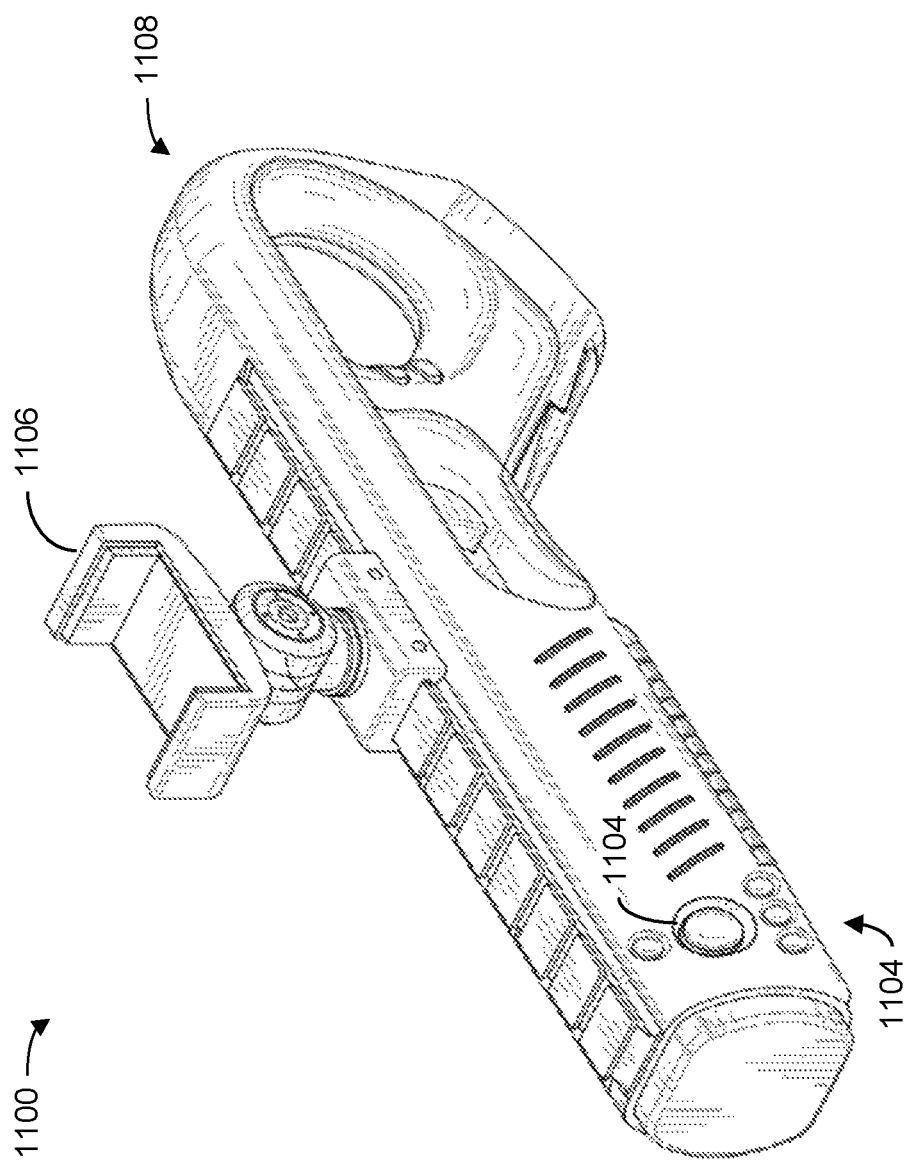
FIG. 11 is a perspective view of a game console including a screen holder coupled to a game console housing of the game console and a joystick, in accordance with some embodiments of the present disclosure.

Elongated portion 306 may be a portion of game console housing 301 that orthogonally extends from grip portion 302 or extends at an angle from grip portion (e.g. horizontally, when grip portion 302 is vertical or near vertical). Elongated portion 306 may be shaped similar to a barrel of a blaster and may be hollow or at least partially solid. An operator may hold grip portion 302 with a first hand and elongated portion 306 with a second hand. In some embodiments, as shown in FIG. 11, elongated portion may include a joystick positioned to be articulated by a thumb of the second hand. Elongated portion 306 may extend from trigger 304 which the operator may pull with their index finger. Additionally, elongated portion 306 may include command buttons 310 on sides of a terminal end 309. Command buttons 310 may be positioned to be pressed by fingers and/or thumbs of the second hand of the user while the user is holding game console housing 301. Command buttons 310 may be positioned on one or opposing sides of elongated portion 306.

Game console 300 may also include a processing circuit (e.g., processing circuit 202) (not shown). The processing circuit may be internally coupled to game console housing 301. In some embodiments, the processing circuit may be insulated by protective components (e.g., components that prevent the processing circuit from moving relative to game console housing 301 or from being contacted by other components of game console 300) so the processing circuit may continue operating while operators are moving game console 300 to play a game and/or an application. Further, in some embodiments, the processing circuit may be coupled to display device 316. The processing circuit may be coupled to display device 316 via any communication interface such as, but not limited to, an HDMI cable, an HDMI low latency wireless transmission technology, HDbitT®, WiFi, etc. The processing circuit may generate and update a user interface being shown on display device 316 based on a game or application that the processing circuit is processing and/or inputs that the processing circuit processes, as described above with reference to FIG. 2.

Display device 316 may be removably coupled to game console housing 301 via latches 307 and screen holder 314. Display device 316 may be coupled to screen holder 314. Latches 307 may include multiple latches that are elevated so a screen holder (e.g., screen holder 314) may be attached to any of the latches. An operator operating game console 300 may remove screen holder 314 from any of the latches and reattach screen holder 314 to a different latch to adjust a position of screen holder 314 and consequently a position of display device 316. In some embodiments, latches 307 and screen holder 314 may be configured so an operator may slide screen holder 314 between latches and lock screen holder 314 into place to set a position of screen holder 314. In some embodiments, screen holder 314 and/or display device 316 may be a part of game console housing 301.

Display device 316 may be coupled to screen holder 314. Display device 316 may be coupled to screen holder 314 with a fastener such as a snap fit, magnets, screws, nails, loop and hooks, etc. In some embodiments, display device 316 and screen holder 314 may be the same component. In these embodiments, display device 316 may be coupled to a latch of latches 307. In some embodiments, display device 316 may be rotatably coupled to screen holder 314 so display device 316 can be rotated about screen holder 314 to a position that an operator desires.

Display device 316 may be a displaying device that can communicate with the processing circuit of game console 300 to display a user interface of a game or application being processed by the processing circuit. In some embodiments, display device 316 may include an internal processing circuit including at least a processor and memory (not shown) that facilitates the transmission of data between display device 316 and the processing circuit of game console 300 and/or a processing circuit of an external device. Display device 316 is shown to include display 318. Display 318 may be similar to display 224, shown and described with reference to FIG. 2. Display device 316 may receive a data stream including a user interface from the processing circuit of game console 300 and display the user interface at display 318.

An operator may press command buttons 310 or 311 and/or power button 312 and/or pull trigger 304 to provide an input to the processing circuit of game console 300. By providing an input to the processing circuit, the operator may adjust the user interface that the processing circuit of game console 300 is providing via display device 316. For example, an operator may perform an action in a game by pressing one of command buttons 310 or 311. In another example, an operator may turn game console 300 on or off by pressing power button 312. Further, the operator may move (e.g., reorient) game console 300 to provide an input to the processing circuit and adjust the user interface of display device 316, as described above.

In some embodiments, game console 300 may include sensors (e.g., sensors) (as shown) that are internally coupled to game console housing 301. The sensors may be a part of an inertial measurement unit that includes sensors such as, but not limited to accelerometers, gyroscopes, magnetometers, etc. The sensors may provide position data identifying a position of game console housing 301 to the processing circuit of game console 300. The processing circuit may receive the position data and update a user interface of display 318 based on the position data.

To update the user interface, the processing circuit may receive current position data and compare the current position data to previous position data corresponding to a previous position of the game console housing. The processing circuit may identify a difference between the position data and update the user interface based on the difference. For example, the processing circuit may receive current position data of game console housing 301. Previous position data may indicate that game console housing 301 was pointing straight. The processing circuit may compare the current position data with the previous position data and determine that game console housing 301 is pointing left compared to the position of the previous position data. Consequently, the processing circuit may change a view of the user interface shown on display 318 to move to the left of a virtual environment or move a cursor on the user interface to the left. In some embodiments, the previous position data may be a calibrated position of game console housing 301 set by an operator.

Characteristics of games or applications being processed by the processing circuit of game console 201 may be shown via light elements 313. Light elements 313 may include parallel slits (e.g., positioned in a row) in game console housing 301 with light bulbs that can provide different colors of light. Light elements 313 may be positioned in any manner. Further, light elements 313 may be positioned on either or both sides of elongated portion 306. The processing circuit of game console 300 may communicate with light elements 313 to provide light based on the game or application that the processing circuit is currently processing. Light elements 313 may provide light based on characteristics of the game or application that the processing circuit is processing. For example, light elements 313 may indicate an amount of health a character of a game has left based on the number of light elements 313 that are lit. In another example, light elements 313 may provide a number of lives that a character has left by lighting up a number of light elements 313 that corresponds to the number of lives the character has left. Light elements 313 may display any sort of characteristics of games or applications.

In an exemplary embodiment, an operator operating game console 300 may hold game console 300 with one or two hands. In some instances, an operator may hold game console 300 with one hand grabbing grip portion 302 and another hand holding onto a portion of game console housing 301 with a finger on trigger 304. In other instances, the operator may use one hand to pull trigger 304 while another hand grabs grip 308. Grip 308 may include a substance that an operator can grip without sliding a hand along elongated portion 306 (e.g., rubber). In some embodiments, portions of grip 308 may be elevated (ridges) from other portions of grip 308 to provide operators with further protections from sliding their hands. Grip 308 may be positioned on elongated portion 306 so hands that grab grip 308 can also push any of command buttons 310 and/or power button 312 without adjusting their position. While holding game console 300, the operator may view display device 316.

Figure 4:
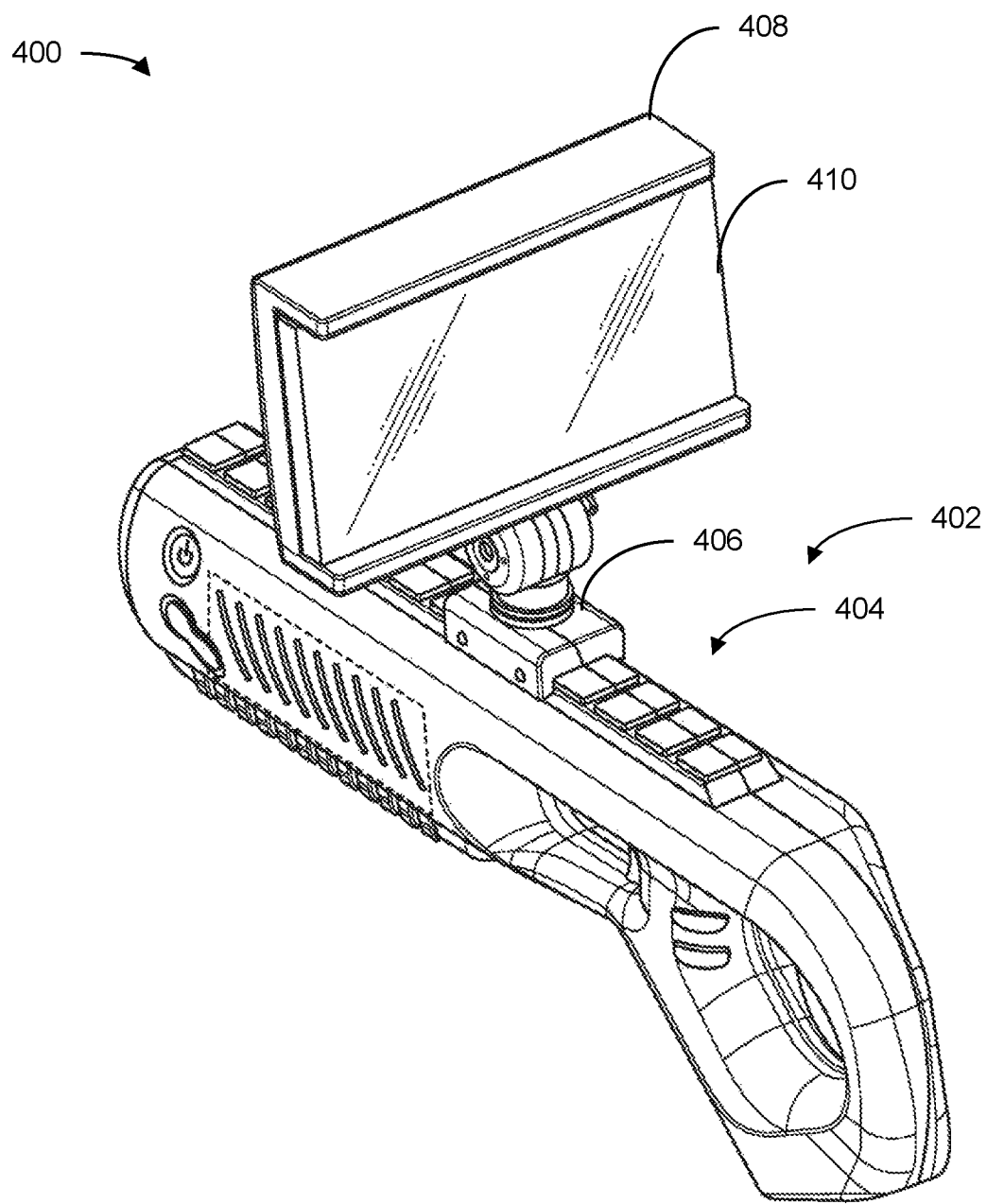
FIG. 4 is perspective view of another game console including a display device coupled to a game console housing of the game console, in accordance with some embodiments of the present disclosure.

Referring now to FIG. 4, a perspective view of a game console 400 including a display device 408 coupled to a game console housing 402 via a screen holder 406 is shown, in accordance with some embodiments of the present disclosure. Game console 400 may be similar to game console 300, shown and described with reference to FIG. 3. Game console 400 is shown to include a game console housing 402, latches 404, a screen holder 406, and a display device 408. Display device 408 is shown to include a display 410. Each of components 402-410 may be similar to corresponding components of game console 300. However, screen holder 406 of game console 400 may be coupled to a latch of latches 404 that is different from the latch that screen holder 314 of game console 300 is coupled to. Screen holder 406 may be coupled to a latch that is closer to an operator of game console 400 so the operator may more easily view display 410 when playing games or applications of game console 400. Screen holder 406 may be adjustable to be position at different locations on a barrel (e.g., on a latch of latches 404) of game console housing 402. Advantageously, screen holder 406 may be coupled to any latch of latches 404 so an operator may operate game console 400 with display 410 at any distance from the operator.

Figure 5:
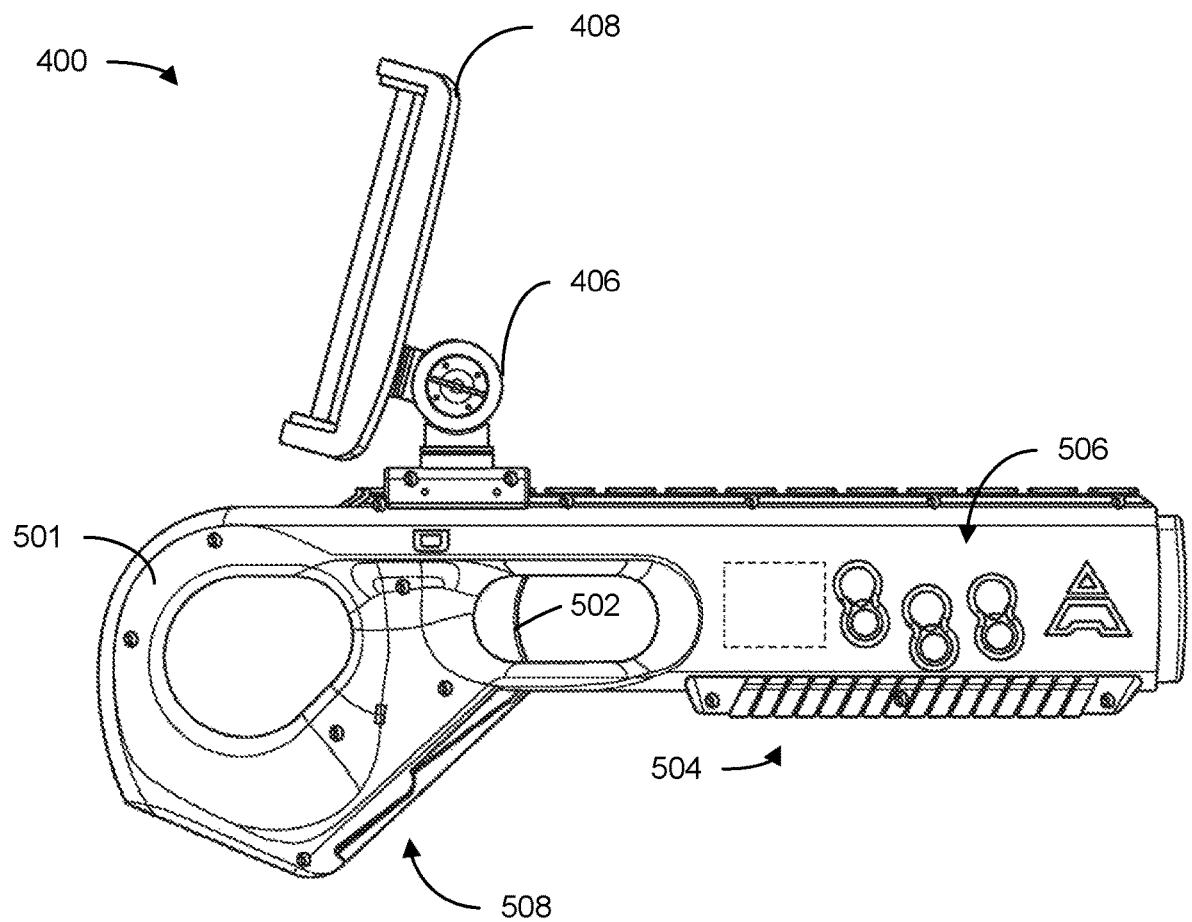
FIG. 5 is a side view of the game console of FIG. 4, in accordance with some embodiments of the present disclosure.

Referring now to FIG. 5, a side view of game console 400, shown and described with reference to FIG. 4, is shown, in accordance with some embodiments of the present disclosure. Game console 400 is shown to include a handle 501, a trigger 502, a grip 504, command buttons 506, a pedal 508, screen holder 406, and display device 408. An operator may interact with any of trigger 502, command buttons 506, and/or pedal 508 to provide inputs to a processing circuit of game console 400 as described above. Further, the operator may hold game console 400 by grabbing grip 504 and handle 501.

In some embodiments, display device 408 may be adjustably (e.g., rotatably) coupled to screen holder 406. Display device 408 may be coupled so an operator may reorient a position of display device 408 in relation to screen holder 406. For example, an operator may rotate display device 408 around screen holder 406 to face upwards or away from the operator. The operator may rotate display device 408 up to 180 degrees depending on how the operator desires display device 408 to be positioned.

Figure 6:
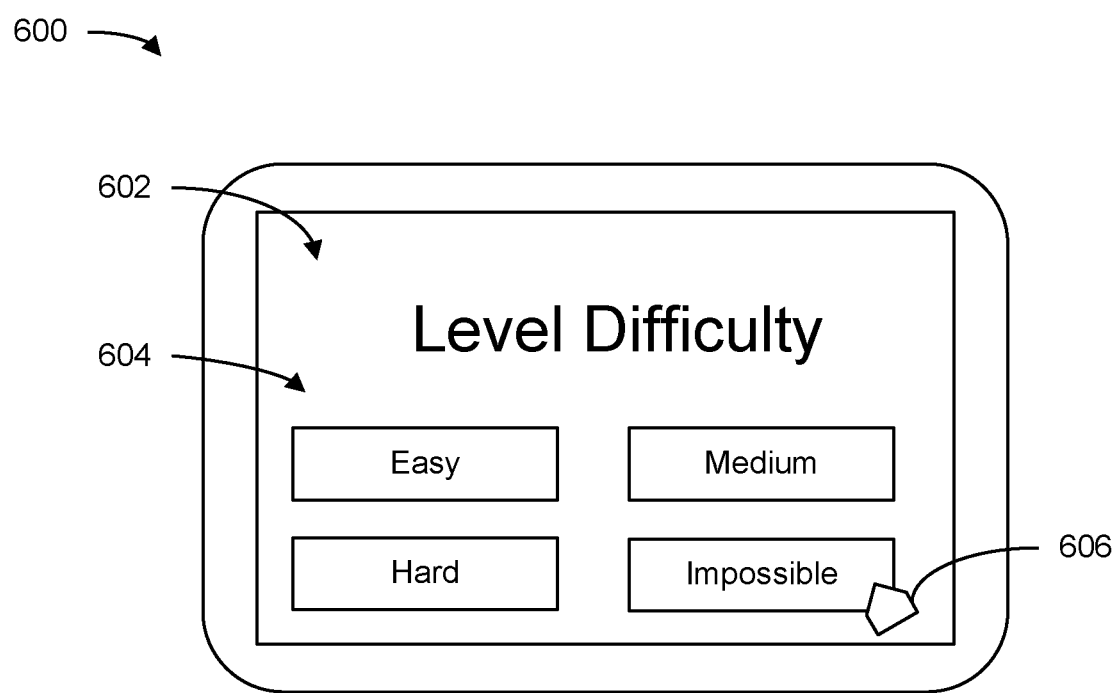
FIG. 6 is a screen display of a user interface displaying various levels of difficulty for an operator to select with the game console of FIG. 3, in accordance with some embodiments of the present disclosure.

Referring now to FIG. 6, a screen display 600 displaying various levels of difficulty for an operator to select with a game console (e.g., game console 201) is shown, in accordance with some embodiments of the present disclosure. Screen display 600 is shown to include a user interface 602. User interface 602 may be displayed by a display of the game console and be associated with a game or application that a processing circuit of the game console is processing. As shown, user interface 602 may include a selection list 604 and a cursor 606. Selection list 604 may include various options of levels of difficulty associated with a game that the game console is currently processing. For example, as shown, selection list 604 may include options such as an easy option, a medium option, a hard option, and an impossible option. An operator may view selection list 604 and select one of the options to begin playing the game with a difficulty associated with the selected option.

In some embodiments, to select an option from selection list 604, an operator may change an orientation of game console 201 to move cursor 606 towards a desired option. The change in orientation may be represented by a change in a position of an end of a barrel of the game console. For example, if cursor 606 is at a top left corner of user interface 602 and an operator wishes to select a medium option of selection list 604, the operator may direct the position of the end of the barrel downwards. The processing circuit of the gaming device may receive signals from sensors of the gaming device indicating that the end of the barrel is moving or has moved downwards and move cursor 606 correspond- ing to the detected movement. Once cursor 606 is over the desired option (e.g., medium), the operator may select the option by pressing an input button or pulling a trigger of the game console. The operator may move cursor 606 in any direction on user interface 602 based on the movement of the game console.

Figure 7:
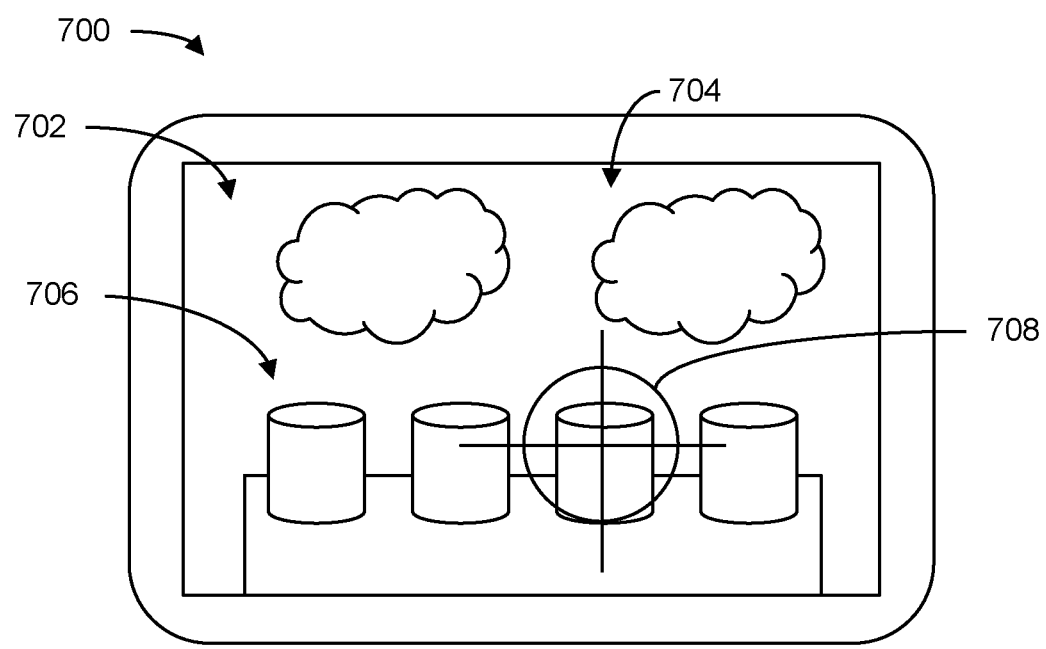
FIG. 7 is a screen display of a user interface of a game being played on the game console of FIG. 3, in accordance with some embodiments of the present disclosure.

Referring now to FIG. 7, a screen display 700 including a user interface 702 of a game being played via a game console (e.g., game console 201) is shown, in accordance with some embodiments of the present disclosure. User interface 702 may be generated and updated by a processing circuit of the game console. User interface 702 may be associated with a game being processed by the processing circuit. The processing circuit may update user interface 702 in response to receiving an input associated with an operator pressing on input buttons on an exterior surface of the game console, pulling a trigger of the game console, or moving or reorienting the game console. User interface 702 is shown to include an environment 704 represented by clouds, a line of cans on a table 706, and crosshairs 708. An operator operating the game console may interact with user interface 702 by moving and pressing push buttons on the game console.

For example, an operator may control a position of crosshairs 708 by moving the game console in a similar manner to how the operator controlled the position of cursor 606, shown and described above with reference to FIG. 6. The operator may position crosshairs 708 over one of the cans and shoot at the cans by pulling on the trigger of the game console. The processing circuit of the game console may receive an indication that the operator pulled the trigger and update user interface 702 to play a sequence of a gun firing at a position represented by a middle of crosshairs 708. If the operator was successful at firing at a can, the processing circuit may update user interface 702 to play a sequence of the can falling off of the table.

Figure 8:
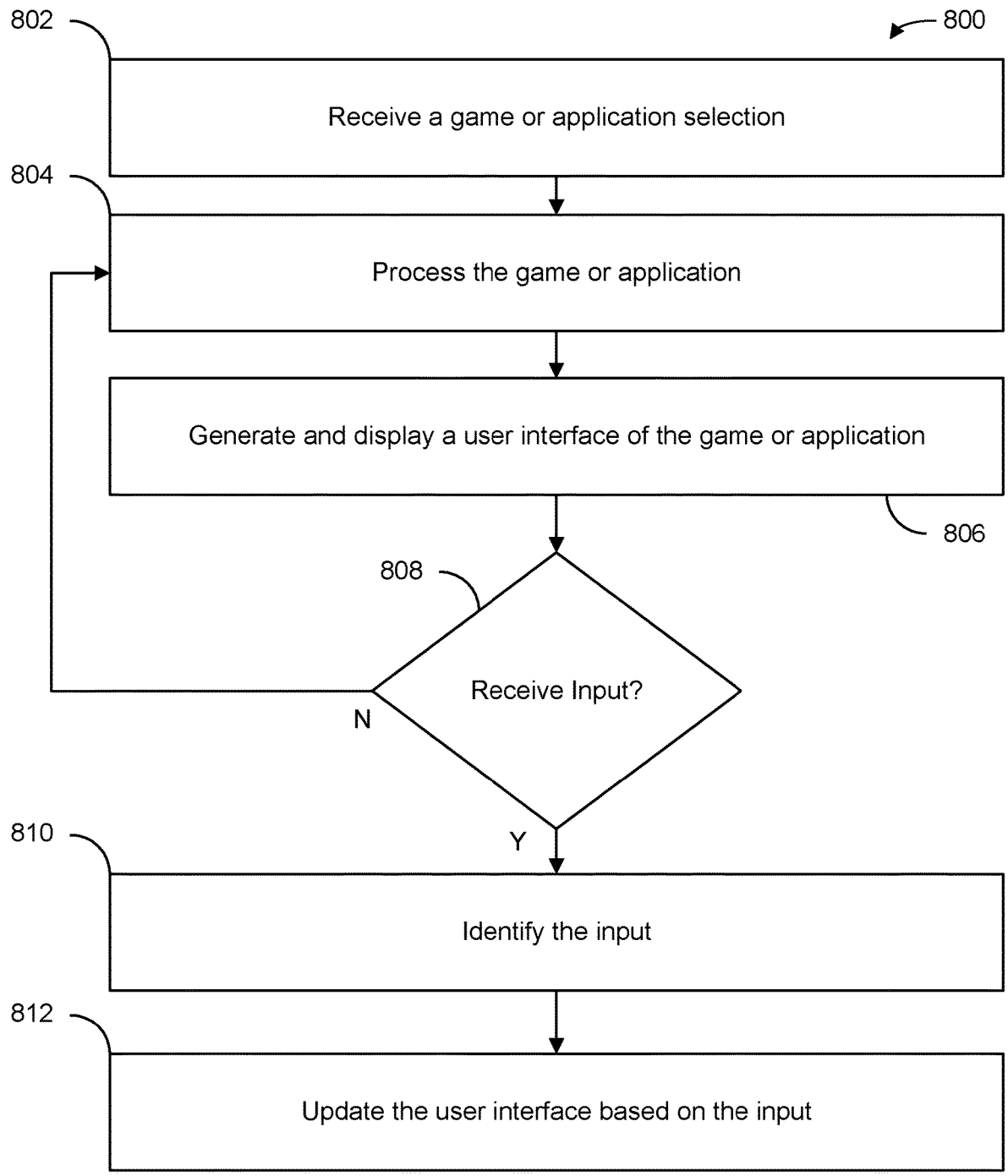
FIG. 8 is an example flowchart outlining operation of the game console of FIG. 3, in accordance with some embodiments of the present disclosure.

Referring now to FIG. 8, an example flowchart outlining operation of a game console as described with reference to FIG. 2 is shown, in accordance with some embodiments of the present disclosure. Additional, fewer, or different operations may be performed in the method depending on the implementation and arrangement. A method 800 conducted by a data processing system (e.g., game console 201, shown and described with reference to FIG. 2) includes receive a game or application selection (802), process the game or application (804), generate and display a user interface of the game or application (806), "receive input?" (808), identify the input (810), and update the user interface based on the input (812).

At operation 802, the data processing system may receive a game or application selection. The data processing system may display a list of games retrieved over a network via an online exchange. The data processing system may display the list of games on a screen of a display device that coupled to a housing of the data processing system. The list of games may be displayed on a user interface that the data processing generates. An operator accessing the data processing system may select one of the games by rotating the housing and pressing a push button or pulling on a trigger of the housing. The data processing system may receive a signal indicating the change in position (e.g., the movement) of the housing and move a cursor being displayed on the user interface. The data processing system may move the cursor in the same direction on the user interface as the operator moves the housing.

Once the operator selects the game or application, at operation 804, the data processing system may process the game or application. The data processing system may process the game or application by downloading files associated with the selected game or application from an external server or processor that stores the selected game or application. The data processing system may download the game or application over a network. Once the data processing system downloads the game or application, at operation 806, the data processing system may generate a user interface associated with the game or application and display the user interface on the screen. In some instances, the game or application may already be downloaded onto the data processing system. In these instances, the data processing system may process the selected game or application to generate the user interface on the screen without downloading the selected game or application from the external server or processor.

Once the data processing system displays the user interface, at operation 808, the data processing system can determine if it has received an input. The data processing system may receive an input when the operator that is operating the data processing system presses on a push button of the housing of the data processing system or changes a position of the housing. If the data processing system does not receive an input, method 800 may return to operation 804 to continue processing the game or application and display the user interface at operation 806 until the data processing system receives an input.

If the data processing system receives the input, at operation 810, the data processing system may identify the input. The data processing system may determine an action associated with the game or application that the data processing system is processing based on the input. For example, the data processing system may receive an input based on the operator pressing a push button. The data processing system may match the push button to a jump action in a look-up table stored by the data processing system. Consequently, the data processing system may determine jumping to be the action.

Once the data processing system determines the action, at operation 812, the data processing system may update the user interface based on the input. The data processing system may display an action sequence at the user interface on the screen based on the determined action. Continuing with the example above associated with the input associated with the jump action, upon determining the jumping action, the data processing system may update the user interface to show a jumping sequence.

In another instance, at operation 810, the data processing system may display a cursor at the user interface. The input may be a detected movement of the housing of the data processing system that sensors coupled to the housing provide to the data processing system. The data processing system may identify the detected movement as movement of the housing. At operation 812, the data processing system may move the cursor on the user interface corresponding to the detected movement of the housing. To move the cursor, the data processing system may detect a current position of the cursor and move the cursor in the same direction as the detected movement of the housing.

Figure 9:
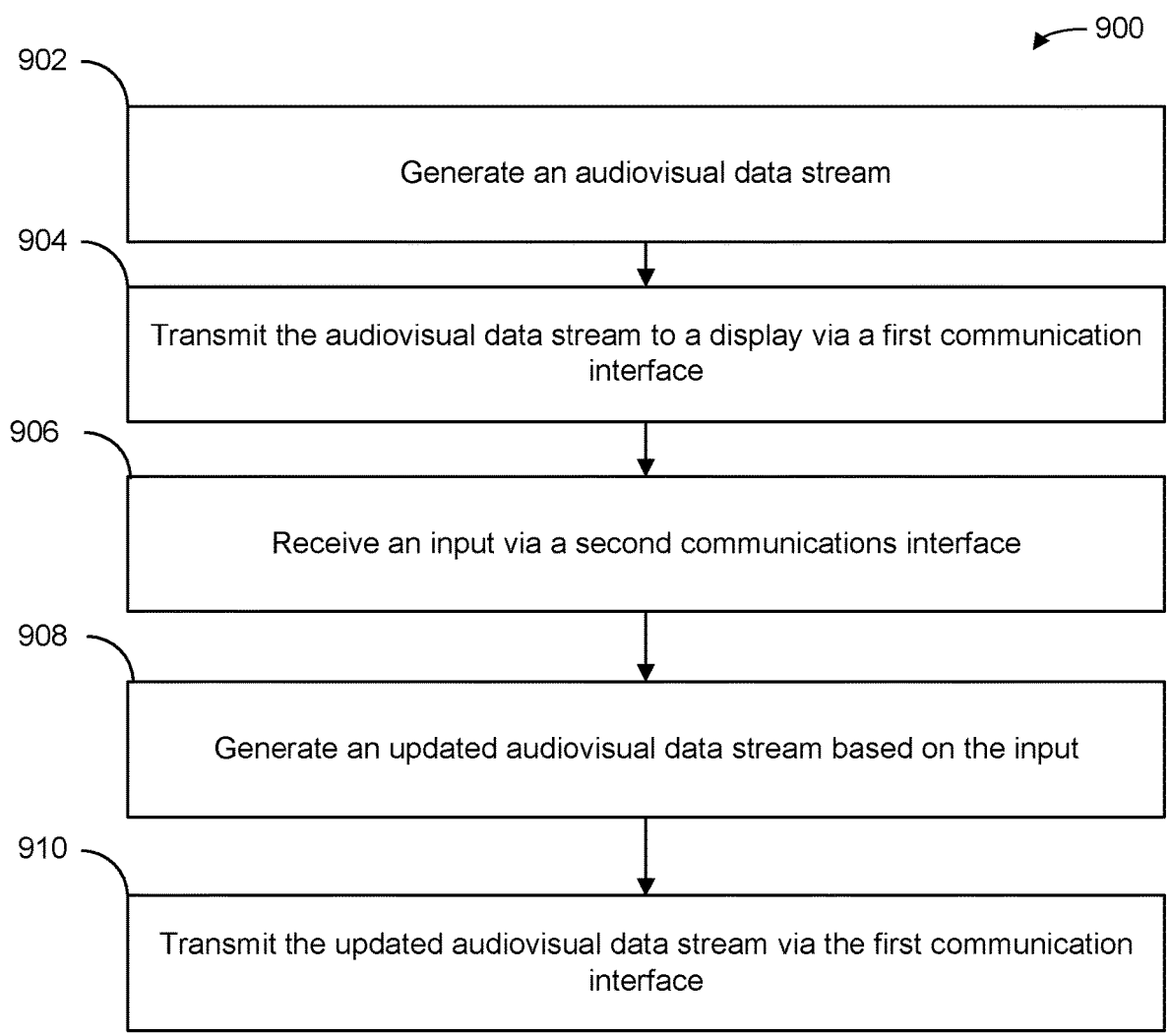
FIG. 9 is an example flowchart outlining a gaming device streaming audiovisual data to the display device of the game console of FIG. 3 while the game console provides inputs to the gaming device, in accordance with some embodiments of the present disclosure.

Referring now to FIG. 9, an example flowchart outlining operation of a game console in communication with a remote gaming device as described with reference to FIG. 2 is shown, in accordance with some embodiments of the present disclosure. Additional, fewer, or different operations may be performed in the method depending on the implementation and arrangement. A method 900 conducted by a first data processing system (e.g., a processing circuit of remote device 228, shown and described with reference to FIG. 2) in communication with a second data processing system (e.g., a processing circuit of game console 201) and a display device coupled to housing of the second data processing system (e.g., display device 222). Method 900 includes generate an audiovisual data stream (902), transmit the audiovisual data stream to the game console (904), receive an input from the game console (906), generate an updated audiovisual data stream (908), and transmit the updated audiovisual data stream (910).

At operation 902, the first data processing system may generate an audiovisual data stream. The first data processing system may generate the audiovisual data stream while processing a game or application associated with the first data processing system. The audiovisual data stream may include visual data associated with a user interface associated with the game or application. The audiovisual data stream may also include audio data that corresponds to the user interface. The user interface may be an interface of a game or application including graphics, menus, or any other component that an operator may view while playing the game or application.

At operation 904, the first data processing system may transmit the audiovisual data stream to the display device of the housing of the second data processing system via a first communication interface and a first communication protocol. The display device may display the user interface of the audiovisual data stream at a screen of the display device. The first communication interface may utilize a lossy transport layer communication protocol. The lossy transport layer communication protocol may enable the display device to quickly handle and display image data and handle quick changes in the user interface (e.g., when a user quickly moves a heads up display while playing a first-person shooting game). While the lossy transport layer communication protocol may cause for the image data to be missing a few data packets (and cause for the picture to be less detailed), the advantages of such a protocol may greatly improve the playing experience of a user that wishes to quickly scan a three-dimensional virtual environment. In some embodiments, the first communication interface may utilize HDbitT® or WiFi to transmit image and/or other data. In some embodiments, an external device may plug in to the first data processing system to provide a wireless HDMI connection from the first data processing system to the display device.

At operation 906, the first data processing system may receive an input from the second data processing system via a second communication interface. The second communication interface may utilize a lossless transport layer communication protocol to transmit data. For example the second communication interface utilize the lossless transport layer communication protocol to transmit control signals such as signals from one or more of position sensors, joystick data, or button data to the first data processing system. In some embodiments, the second communication interface may utilize Bluetooth or other forms of communication to do so. The input may correspond to a signal generated by the second data processing system responsive to an operator pressing a push button on the housing of the second data processing system, joystick data, or data generated by sensors coupled to the housing detecting that the housing moved. The second data processing system may process the signals generated from the sensors based on detected movement, joystick data, or push buttons based on the push buttons being pressed and send the signals to the first data processing system to be processed. Advantageously, by using a lossless transport layer communication protocol to transmit such signals to the first data processing system, the second communication interface may ensure that signals are sent and processed accurately.

At operation 908, the first data processing system may receive the signals from the second data processing system and generate an updated audiovisual data stream based on the signals. The first data processing system may receive the inputs and determine actions that are associated with the inputs. The first data processing system may determine the actions by comparing the inputs to an internal look-up table that is specific to the game or application that the first data processing system is currently processing. The first data processing system may identify a match and generate an updated audiovisual data stream based on the match in the look-up table. At operation 910, the second data processing system may transmit the updated audiovisual data stream to the display device to update the user interface being shown on the display via the first communication interface and the first communication protocol.

In some embodiments, the first data processing system may receive a signal from a joystick and a signal from a position sensor of the second data processing system. The first data processing system may combine the signals and generate the updated audiovisual data stream based on the updated signal. In some embodiments, the second data processing system may combine the signals to generate a third signal and transmit the third signal to the first data processing system. The first data processing system may update the audiovisual data stream based on the third signal in such embodiments. The first data processing system or the second data processing system may combine the signals in the manner described below with reference to FIGS. 10A-C.

Advantageously, by using different communication protocols to transmit data between a data processing system and a remote data processing system depending on the type of data being transmitted, the data processing system may operate to provide a more low-latency experience to a user playing a video game. Using a lossless communication layer protocol to transmit control signals to the remote data processing is useful for control signals that are smaller and that are more important to be accurate. The communication may still be fast while ensuring higher accuracy of the signal. On the other hand, because the remote data processing system responds with audiovisual data and especially in an application context where the interface change rapidly, it may be important for the remote data processing system to send large data files such as audiovisual data back to data processing system to ensure that the user interface can keep up with any inputs the user provides to the remote data processing system.

Figure 10A:
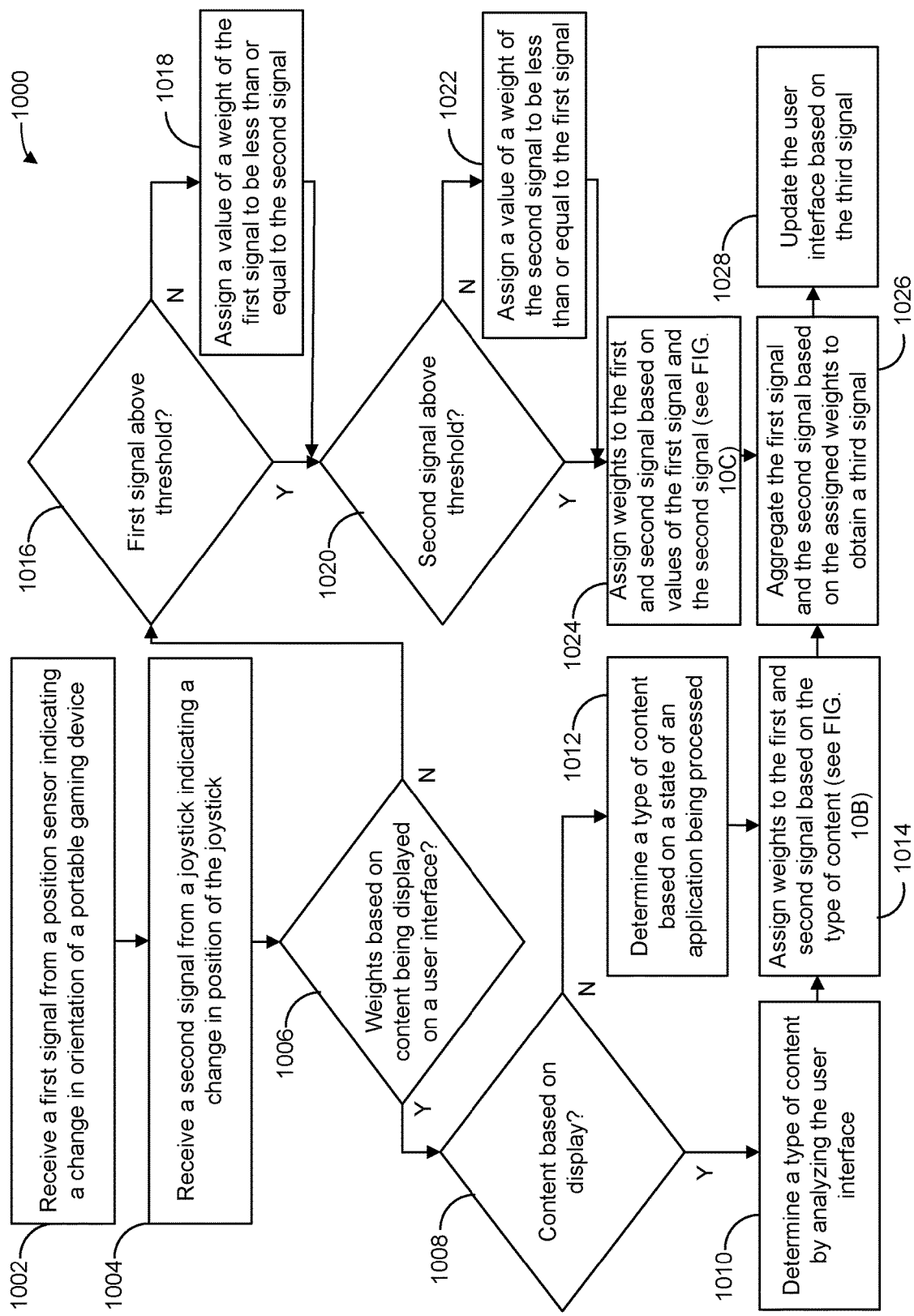
FIG. 10A is an example flowchart outlining aggregating signals from a joystick and a position sensor to update a user interface, in accordance with some embodiments of the present disclosure.

Referring now to FIG. 10A, an example flowchart outlining updating a user interface based on a combination of signals from a joystick and a position sensor is shown, in accordance with some embodiments of the present disclosure. Additional, fewer, or different operations may be performed in the method depending on the implementation and arrangement. A method 1000 conducted by a data processing system (e.g., processing circuit 202 or processing circuit 230, shown and described with reference to FIG. 2). Method 1000 may enable the data processing system to dynamically process and combine inputs from a joystick and position sensors to update a user interface. Method 1000 may enable the data processing system to do so by assigning and updating weights for signals from the joystick and the position sensors as a user accesses different applications and/or states of an application.

At operation 1002, the data processing system may receive a first signal from a position sensor indicating a change in orientation of a portable gaming device. The position sensor may be a gyroscope, an accelerometer, an inertial measurement unit, or some other position sensing device. In some embodiments, the first signal includes a magnitude or value indicating an amount of change in the orientation of the portable gaming device. For example, a user holding the portable gaming device may point the portable gaming device from a straight position to a position looking up. A position sensor may detect the change in position of the portable gaming device and generate and transmit a signal with a value or magnitude that is proportional to the change in position of the portable gaming device to the data processing system. In some embodiments, the signal also includes a direction. Continuing with the example above, the signal may include a direction indicator indicating that the user holding the portable gaming device pointed the device upwards in the signal.

At operation 1004, the data processing system may receive a second signal from a joystick indicating a change in position of the joystick. The joystick may be a 3-axis or a 2-axis joystick, a directional pad, a square or rectangular touchpad, or similar interface. Further, the joystick may be a digital joystick, a paddle joystick, an analog joystick, a PC analog joystick, a joypad, or any other type of joystick. In some embodiments, the second signal may include a magnitude or value indicating an amount of change in position of the joystick from a resting position. For example, the second signal may be an analog voltage representing a distance on an axis (e.g. x or y axis) that the joystick has been moved, or the second signal may be a digital signal representing a quantized position along the axis determined via an analog to digital converter. In some embodiments, the magnitude of the second signal corresponds to an angle at which the joystick pivots from its contact point with the portable gaming device. In some embodiments, the larger the angle, the larger the magnitude. For example, a user holding the portable gaming device may maneuver the joystick with his or her thumb. The user may push the joystick sideways. Accordingly, the joystick may generate a signal indicating that the user pushed the joystick sideways and a magnitude of the distance that the user pushed the joystick sideways. The joystick may send such a signal to the data processing system for processing in addition to or instead of the signal that the position sensor sends.

At operation 1006, the data processing system may determine whether to assign weights to the first signal and the second signal based on content currently being displayed on a user interface of the portable gaming device or based on the first signal and/or the second signal. The data processing system may determine to assign the weights based on the content being displayed on the user interface if there is a change in what is being shown on the user interface or if there is a change in a state of an application being executed by the data processing system. For example, the data processing system may determine to assign weights based on the content being shown on the user interface if the data processing system detects that a user just entered a zoomed-in view of the user interface. In another example, the data processing system may determine to assign weights based on the content being shown on the user interface if the data processing system determines that the application being executed by the data processing system entered a state with a menu. In some embodiments, the data processing system may determine to assign the weights based on a type of application that the processor just began executing. For example, if the data processing system begins executing an application, the data processing system may identify a type of the application (e.g., first-person shooter, adventure game, menu game, joystick focused game, etc.) and assign weights to the signals based on the determined type of the application.

The data processing system may determine to assign weights based on the first signal and/or the second signal if the data processing system detects a sudden change in the value of the first signal and/or the second signal. For example, if a user suddenly pushes a joystick forward, the data processing system may detect the change and assign or adjust weights to the signals accordingly. In another example, if a user suddenly jerks the portable game console upwards, the data processing system may receive a signal from the position sensor indicating the sudden change in orientation of the portable gaming device and adjust the weights of the signals accordingly. Accordingly, in some implementations, weights may be assigned or adjusted responsive to a derivative or rate of change of either or both signals.

If the data processing system determines to assign weights to the application based on the content being displayed on the user interface, at operation 1008, the data processing system may determine whether to determine a type of the content by analyzing the contents of the user interface or whether to analyze the state of the application being executed by the data processing system. The data processing system may utilize the type of content to determine weights for the signals from the joystick and/or the position sensors. The data processing system may make such a determination based on how it is configured (e.g., based on settings established by an administrator). For example, an administrator may configure the data processing system to determine the type of content based on the objects or structures that are displayed via the user interface or based on a state of the application that the data processing system is executing.

If the data processing system is configured to determine the type of content based on the display, at operation 1010, the data processing system may analyze the current user interface to determine the type of content the user interface is currently displaying. For instance, the data processing system may use screen scraping or optical character recognition to identify objects and/or characteristics of the user interface to determine a type of content currently being shown on the user interface. For example, the data processing system may identify portions of the interface and determine that cross hairs of a heads up display (HUD) are larger than normal and consequently determine that the display is displaying a zoomed-in first-person shooter type content based on the large cross hairs. In another example, the data processing system may identify outlines of a menu system and determine that the type of content currently being displayed on the user interface is a menu. The data processing system may use any objects or indicators on the display to determine type of content currently being displayed. Examples of types of content include, but are not limited to, zoomed-in first-person shooter, text, HUD, menu, browser, etc.

The data processing system may also analyze the content being displayed on the user interface by sending an application programming interface (API) request to the user interface. The user interface may respond with a list of objects currently being displayed. The user interface may also include other metadata about the user interface such as layout metadata and record metadata. Accordingly, the data processing system may compare the response from the user interface to a database to match the objects to a type of content currently being displayed on the user interface. If the data processing system finds a type of content with matching characteristics of the response to the database, the data processing system may determine the type of content with the matching characteristics is the type of content currently being displayed on the user interface. For example, the data processing system may send an API request to the user interface. The user interface (through an API) may respond with a list of objects that are normally found in an HUD. The data processing system may compare the list of objects to a database within the data processing system and determine that the type of content currently being shown is an HUD.

If, at operation 1008, the data processing system is configured not to determine the content on the display based on the display of the user interface itself, at operation 1012, the data processing system may determine the type of content based on a state of an application being executed. The data processing system may determine the state of the application by analyzing the application by identifying the part of the application that is currently executing and determining a state based on the identified part. The data processing system may identify the part of the application by keyword parsing through the code of the application being executed to identify the state of the application. For example, the data processing system may analyze the code of the application that is currently being executed to identify any words that are associated with a state. The data processing system may compare the code to a database to identify any matching states. In some embodiments, the application may be configured to have indications indicating a current state of the application. For example, whenever a user enters into a zoomed-in view of an environment of a first-person shooter, the corresponding application may specify a tag that the data processing system may read indicating that the user interface is currently showing the zoomed-in view. The data processing system may use any method to identify the current state of an application being executed.

At operation 10124, the data processing system may assign weights to the first and second signal based on the type of content that was determined in operations 1010 and 1012. The data processing system may assign the weights by identifying the type of content currently being shown and assigning weights to each signal based on a type of content in a database of the data processing system. An example process for determining the types of weights for the signals based on the type of content currently being shown on the user interface is shown and described below with reference to FIG. 10B. Each signal may be assigned any weight. In some embodiments, the weights may be assigned and updated as the application is being executed so the weights may correspond to the types of content on display on the user interface in real-time.

If, at operation 1006, the data processing system determines that weights for signals for the joystick and the position are based on sudden changes in orientation of the portable gaming device, at operation 1016, the data processing system may determine if the first signal from the position sensor has a value that exceeds a threshold. As described above, the first signal may be associated with a value or weight indicating a degree to which the user reoriented the portable gaming device. The data processing system may compare the value to a threshold that is predetermined by an administrator. The data processing system may do so to stop slight movements from greatly impacting a change in the user interface. For example, if a user is playing a first-person shooter and attempting to shoot at a small object, the data processing system may adjust the weights of the signals to avoid changing the user interface based not twitches or slight variations in the position of the portable gaming device when a user is attempting to keep the portable gaming device in one position. Accordingly, the data processing system may determine whether the user is reorienting the portable gaming device to a threshold to avoid slight movements from having a great impact on the user interface.

If, at operation 1016, the data processing system determines that the signal from the position sensor is below the threshold, at operation 1018, the data processing system may assign a value of a weight of the first signal to be less than or equal to a weight of the second signal from the joystick. The data processing system may be configured to assign the weight to be zero, in some instances. For example, if a user is attempting to target a small object and only slightly moving the portable gaming device, the data processing system may adjust the weight of the signal from the position sensor to be zero. Consequently, the user may aim at the small object using only the joystick, improving the accuracy of the user.

If, at operation 1016, the data processing system determines that the first signal from the position sensor is above the threshold, at operation 1020, the data processing system may determine whether the second signal from the joystick is above the threshold. Similar to the position sensor signal, the data processing system may determine if the second signal is above the threshold to avoid any drift in the user interface that may occur if the joystick is not repositioned perfectly after being moved or when the joystick moves back to its home position (e.g., about 90 degrees to the portable gaming device). For example, if a user uses the joystick to control a view on the user interface, the joystick may not perfectly go back to home position. By establishing a threshold change in position that the joystick must exceed to be used, any danger of the user interface drifting may be minimized. The threshold may be set by an administrator.

If, at operation 1020, the data processing system determines that the signal from the position sensor is below the threshold, at operation 1022, the data processing system may assign a value of a weight of the second signal from the joystick to be less than or equal to a value of a weight of the first signal from the position sensor. The data processing system may be configured to assign the weight to be zero, in some instances. For example, as described above, the data processing system may assign the joystick with a weight of zero to avoid any drift in the user interface.

If, at operation 1020, the data processing system determines that the signal from the joystick is below the threshold, at operation 1024, the data processing system may otherwise assign weights to the first and second signals based on the values of the first and second signals. For example, the data processing system may compare the values of the first and second signals to each other and, if one value is significantly higher than the other, the data processing system may determine that the signal with the significantly higher value is more important and worth more weight. If the weights are similar, the data processing system may not adjust or update the weights. Accordingly, the data processing system may adjust or update the weights according to how the user is manipulating the portable gaming device and/or moving the joystick. The data processing system may assign any weights to the signals based on the joystick and/or position sensor signals. An example process for determining the types of weights for the signals based on the signals themselves is shown and described below with reference to FIG. 10C. Each signal may be assigned any weight. In some embodiments, the weights may be assigned and updated as the application is being executed so the weights may correspond to how users operate the portable gaming device in real-time.

At operation 1026, the data processing system may aggregate the weighted first signal and the weighted second signal to obtain a third signal. The data processing system may perform any operation (e.g., aggregation, multiplication, averaging, subtraction, etc.) on the weighted signals to obtain the third signal. For example, the data processing system may multiply the weights by their corresponding values and aggregate or add the resulting values to obtain the third signal. In another example, the data processing system may multiply the weights by their corresponding values and multiply the resulting signals to obtain the third signal. The data processing system may perform any operations on the weights and the weighted signals to obtain the third signal.

At operation 1028, the data processing system may update the user interface based on the third signal. The data processing system may update the user interface based on the application that the data processing system is executing. For example, if the data processing system is executing an application with a cursor, the data processing system may update the user interface by moving the cursor proportional to and in a direction specified by the third signal. In another example, the data processing system may update the user interface by changing the view of the HUD in a three-dimensional environment. In yet another example, the data processing system may perform a predetermined action that is associated with any of the first, second, or third signals (e.g., a sudden jerk movement up in the portable gaming device may cause a reloading action to occur on the user interface). The data processing system may update the user interface in any manner based on these signals.

Figure 10B:
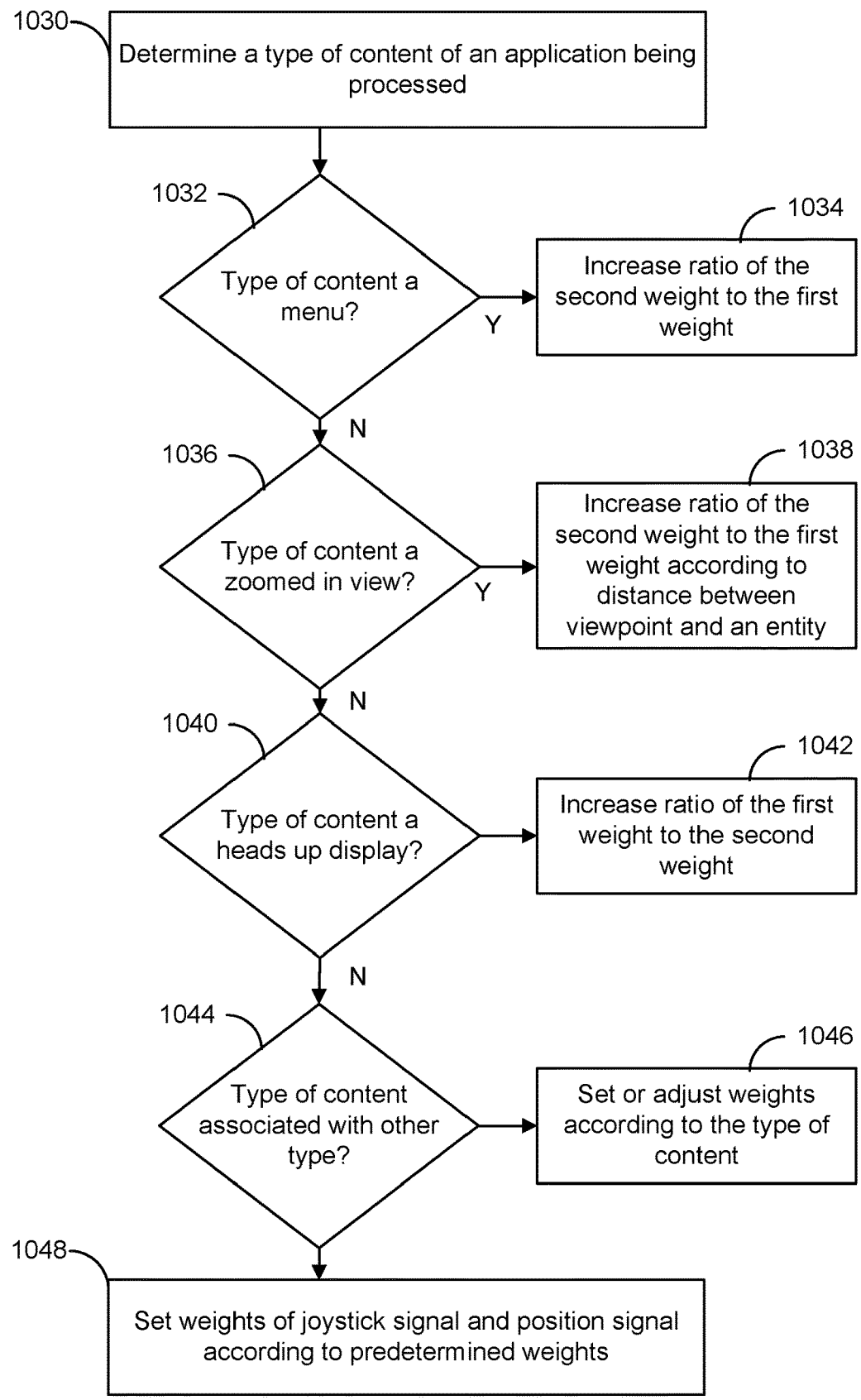
FIG. 10B is an example flowchart outlining assigning weights to a joystick signal and/or a position sensor signal based on a type of content being displayed on a display, in accordance with some embodiments of the present disclosure.

Referring now to FIG. 10B, an example flowchart outlining assigning weights to a joystick signal and/or a position sensor signal based on a type of content being displayed on a display is shown, in accordance with some embodiments of the present disclosure. Additional, fewer, or different operations may be performed in the method depending on the implementation and arrangement. A method 1029 conducted by a data processing system (e.g., processing circuit 202 or processing circuit 230, both shown and described with reference to FIG. 2). Method 1029 may enable the data processing system to dynamically assign weights to joystick signals and position sensor signals based on a type of content currently being displayed on a user interface.

At an operation 1030, the data processing system may determine a current type of content of an application currently being executed. As described above with reference to operations 1008-1012, shown and described with reference to FIG. 10, the data processing system may determine the current type of content based on what is being displayed on the screen or based on the current state of the application being executed. For example, the data processing system may determine the current type of content using API requests, screen scraping, or by otherwise analyzing the application to determine its state in real-time. The data processing system may determine the current type of content in any manner.

At an operation 1032, the data processing system may determine if the type of content is a menu. The data processing system may make such a determination by analyzing the user interface looking for keywords or otherwise outlines of menus. In some embodiments, the data processing system may determine the type of content by analyzing the application being executed and determining a current state of the application. If the data processing system determines that the current type of content being displayed on the user interface is a menu, at an operation 1034, the data processing system may increase the ratio of the second weight (e.g., the weight of the joystick signal) to the first weight (e.g., the weight of the position sensor signal). The data processing system may solely increase the weight of the second signal, solely decrease the weight of the first signal, or do both to increase the ratio. Advantageously, by making the joystick have a larger impact when the user interface is a menu, a user may more accurately select a menu item without having to move the portable gaming device and instead just use the joystick.

At an operation 1036, the data processing system may determine if the type of content is a zoomed-in type of content. For example, a zoomed-in type of content may be a close-up view of an area within a three-dimensional environment compared to a standard view. For instance, if a person playing a first-person shooter scopes in to get a closer view of an area, that is a zoomed-in type of content. The data processing system may make such a determination by analyzing the user interface looking for thick outlines of crosshairs or some other indicator on the user interface or performing any method of determining the type of content as described herein. If the data processing system determines that the current type of content being displayed on the user interface is a zoomed-in type of content, at an operation 1038, the data processing system may increase the ratio of the second weight to the first weight. For example, the data processing system may solely increase the weight of the second signal, solely decrease the weight of the first signal, or do both.

In some embodiments, the data processing system may increase the ratio according to a distance an entity within the three-dimensional environment is from a viewpoint of the user interface (e.g. a distance between an entity and a virtual camera within a three-dimensional virtual environment). For example, if the entity is a large distance away, the data processing system may cause the ratio of the second signal to the first signal to be higher than if the entity is a close distance away. In some embodiments, the data processing system may otherwise adjust the weights according to the position of the entity by keeping the ratio the same while increasing or decreasing both the weights of the second signal and the first signal. Advantageously, by making the joystick have a larger weight when the user interface is in a zoomed-in view, a user may more accurately shoot at an object that may be smaller on the user interface. Further, by dynamically adjusting the weights based on a target entity, a user may more accurately aim at the target entity.

At an operation 1040, the data processing system may determine if the type of content is an HUD. The data processing system may make such a determination by analyzing the user interface looking for indicators of a HUD on the user interface or by using any other method as described herein. If the data processing system determines that the current type of content being displayed on the user interface is an HUD, at an operation 1042, the data processing system may increase the ratio of the first weight to the second weight. For example, the data processing system may solely increase the weight of the first signal, solely decrease the weight of the second signal, or do both. Advantageously, by making the position sensor signal have a larger weight when the user interface is an HUD, a user may more quickly scan a three-dimensional environment by reorienting the portable gaming device while being able to use the joystick to hone in on targets within the environment.

At an operation 1044, the data processing system may determine if the type of content is any other type of content with an identification in a database of the data processing system. The data processing system may make such a determination by analyzing the user interface and/or the application being executed by the data processing system using any of the methods described herein and comparing characteristics of the user interface or a current state of the application to a database. If the data processing identifies any matching types of content, the data processing system may identify a corresponding set of weights and, at an operation 1046, the data processing system may set or adjust the weights of the first and/or the second signal according to the corresponding set of weights. An administrator may set or adjust the weights for each type of content and store the set or adjusted weights in the database. An administrator may set or adjust the weights to any values.

If the data processing system does not identify any types of content from the state of the application or the user interface, at an operation 1048, the data processing system may set the weights of the first signal and second signal to predetermined weights. The predetermined weights may be any set of weights as determined by an administrator. For example, the predetermined set of weights may have the weight associated with the second signal from the joystick to be lower than the weight associated with the first signal from the position sensor. Accordingly, a user may use the joystick for fine control of the user interface and the position sensor signal to make larger changes while controlling the user interface. For example, a user may quickly scan a three-dimensional environment by reorienting the portable gaming device while using the joystick to hone in on a target. An administrator may set the preset weights as they desire. Advantageously, by using the preset weights, an administrator may control the user interface of the portable gaming console as he or she intends.

Figure 10C:
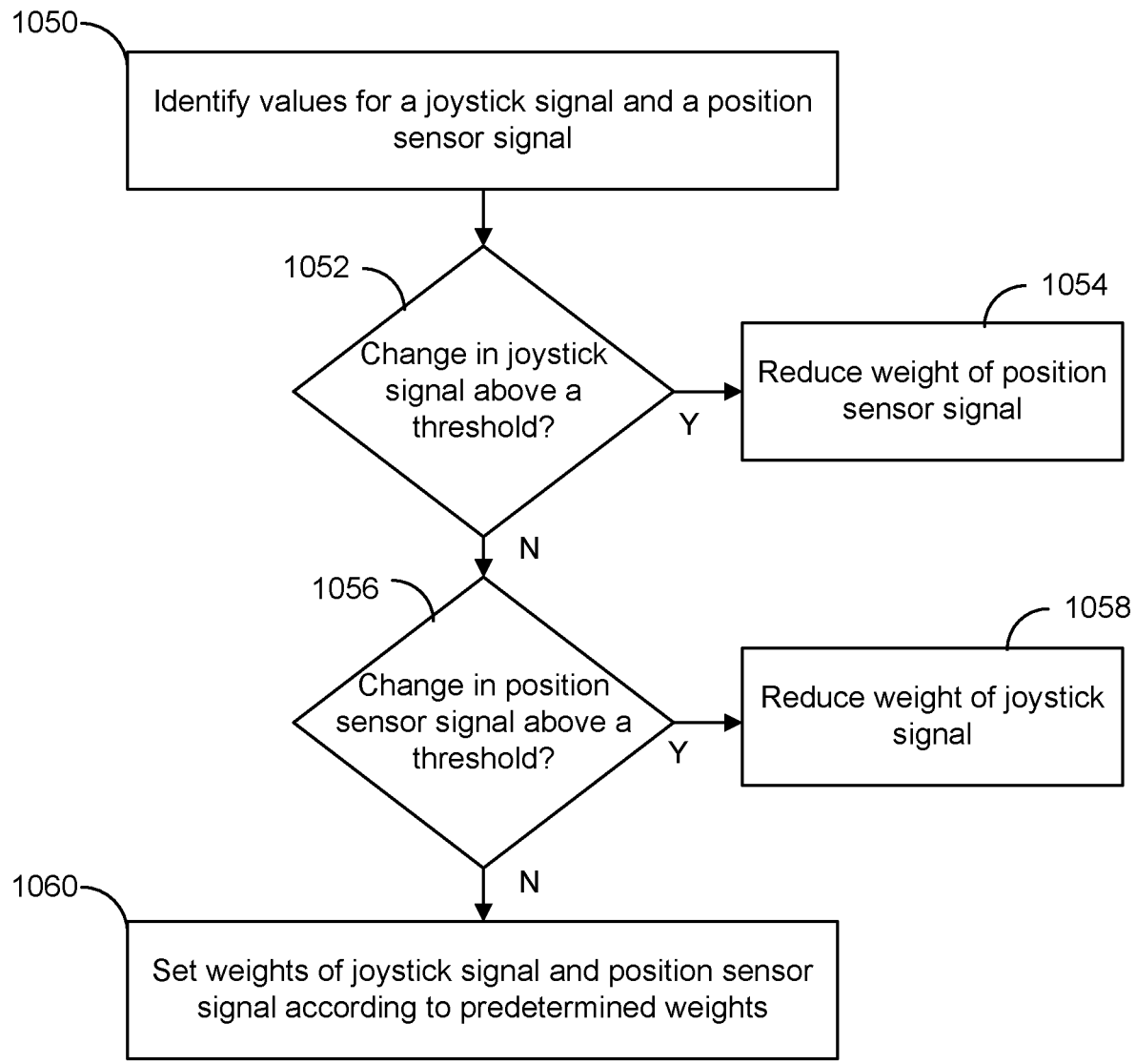
FIG. 10C is an example flowchart outlining assigning weights to a joystick signal and/or a position sensor signal based on a change in position of a joystick or a game console, in accordance with some embodiments of the present disclosure.

Referring now to FIG. 10C, an example flowchart outlining assigning weights to a joystick signal and/or a position sensor signal based on a change in position of a joystick or a game console is shown, in accordance with some embodiments of the present disclosure. Additional, fewer, or different operations may be performed in the method depending on the implementation and arrangement. A method 1049 conducted by a data processing system (e.g., processing circuit 202 or processing circuit 230, both shown and described with reference to FIG. 2). Method 1049 may enable the data processing system to dynamically assign weights to joystick signals and position sensor signals based on values of the signals themselves.

At an operation 1050, the data processing system may identify values for a joystick signal and a position sensor signal. The values may be a magnitude of a change in position of the position sensors and/or the joystick with respect to its previous position or resting position. The data processing system may identify the values based on the signals that the data processing system receives. For example, if a user moves a joystick far forward, the data processing system may identify a high value associated with the forward movement of the joystick. In another example, if a user suddenly points the portable gaming device downward, the data processing system may identify a value of the signal from the position sensor as a large value associated with a downward movement. The data processing system may identify values in any manner.

At an operation 1052, the data processing system may determine if the change in the joystick signal is above a threshold. For instance, the data processing system may compare the value of the signal that it receives from the joystick to a threshold and determine if the value is above the threshold. If the data processing system determines the value to be above the threshold, at operation 1054, the data processing system may increase the ratio of the joystick signal to the position sensor signal. The data processing system may do so in cases where a user is only using or mostly using the joystick to update the user interface, such as when the user is controlling a cursor on a menu interface or a zoomed-in view of an application. By increasing the weight of the joystick, the data processing system may allow for users to more easily control the user interface.

At an operation 1056, the data processing system may determine if the change in the position sensor signal is above a threshold. For instance, the data processing system may compare the value of the signal that it receives from the position sensor to a threshold and determine if the value is above the threshold. If the data processing system determines the value to be above the threshold, at operation 1058, the data processing system may increase the ratio of the position sensor to the joystick signal. The data processing system may do so in cases where a user is only using or mostly using control of the portable gaming device to update the user interface, such as when the user is controlling an HUD. By increasing the weight of the position sensor signal, the data processing system may allow for users to more easily control the user interface. If the data processing system determines that neither the weight of a change in the joystick signal or a change in the position sensor signal exceeds a threshold, at operation 1060, the data processing system may set weights of the joystick signal and the position sensor signal according to predetermined weights. The data processing system may set the weights similar to how the data processing system set the weights in operation 1048, shown and described with reference to FIG. 10B.

Referring now to FIG. 11, a perspective view of a game console 1100 including a screen holder 1106 coupled to a game console housing 1108 of game console 1100 and a joystick 1102 is shown, in accordance with some embodiments of the present disclosure. Screen holder 1106 may be configured to hold a mobile device (e.g., a smartphone) (not shown) to execute applications on the mobile device. The mobile device may communicate with a processor internally coupled to game console housing 1108 to operate as game console 1100. The processors may operate and communicate together to process games or applications while using various inputs to update the user interface on the mobile device. In some embodiments, instead of a mobile device, a different display device may be coupled to game console housing 1108 and any processing that is performed is performed on the processor that is internally coupled to the game console housing 1108 or on a remote device (not shown).

A user may hold a grip portion of game console 1100 and maneuver game console 1100. In turn, game console 1100 may transmit signals to the mobile phone to update a user interface of the mobile phone. Further, without changing a grip on game console 1100, the user may move joystick 1102 and/or press buttons 1104. Buttons 1104 may be on one or both sides of the elongated portion of game console 1100. The processor within game console housing 1108 and/or of a mobile device may receive inputs from joystick 1102, buttons 1104, and/or a position sensor on game console housing 1108 and accordingly update a user interface as described herein.

Figure 12:
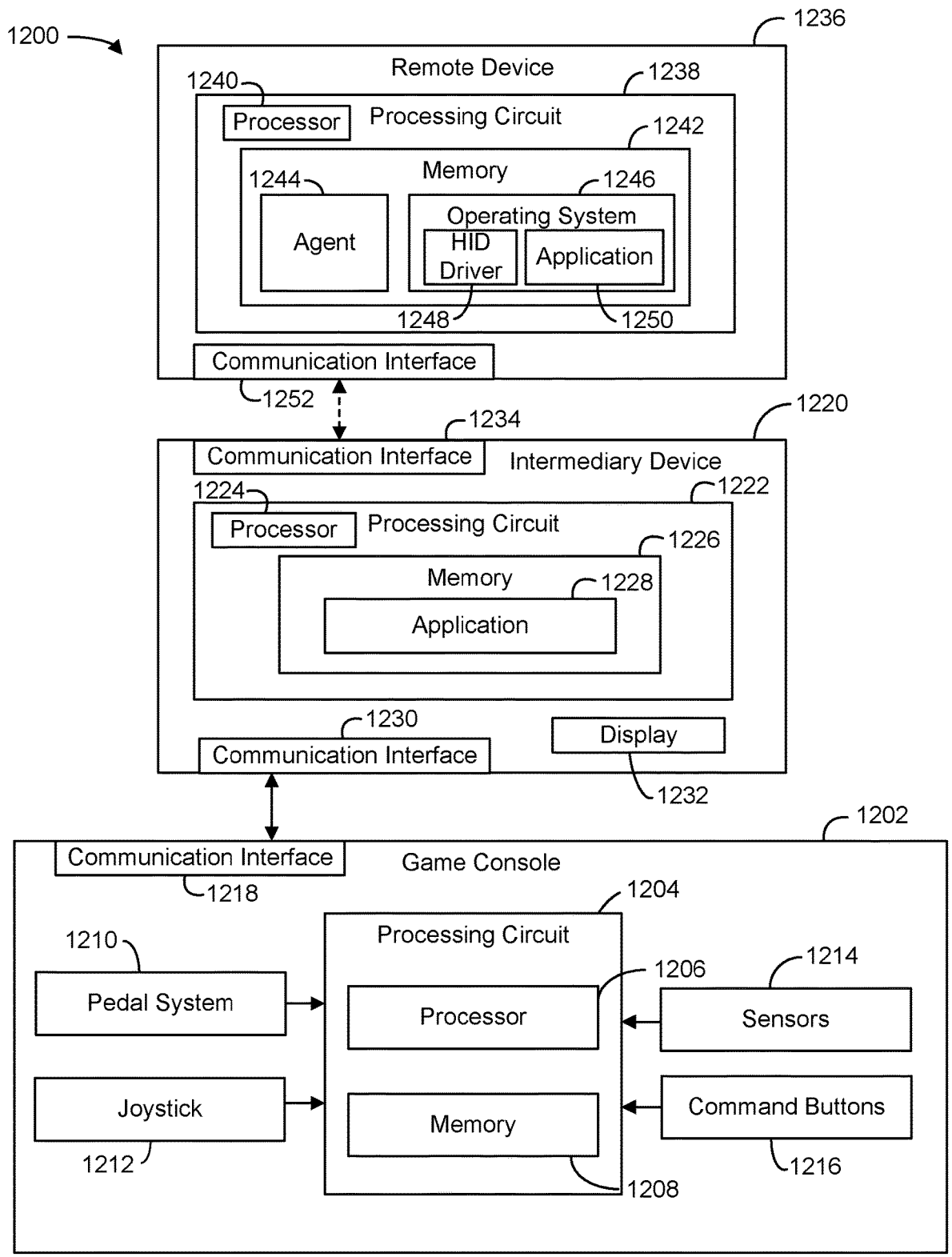
FIG. 12 is a block diagram of an exemplary embodiment of a system for communicating interactive data between heterogeneous devices, in accordance with some embodiments of the present disclosure.

Referring now to FIG. 12, a block diagram of an exemplary embodiment of a system 1200 for communicating interactive data between heterogeneous devices is shown, in accordance with some embodiments of the present disclosure. System 1200 is shown to include an intermediary device 1220 that may bridge communication between a game console 1202 and a remote device 1236 via different communication protocols. In brief overview of system 1200, game console 1202 may provide inputs to intermediary device 1220 via a first communication protocol. Intermediary device 1220 may transmit the inputs to remote device 1236 via a different second communication protocol. The second communication protocol may be incompatible with the first communication protocol (e.g. require different hardware for transmission and reception). Although primarily discussed as wireless protocols, in some implementations, either the first or second or both communications protocols may be wired. For example, one communication protocol may be USB and a second communication protocol may be WiFi. Remote device 1236 may process a game or application and transmit a media (audiovisual) stream to intermediary device 1220. Additionally and, in some cases, concurrently, remote device 1236 may receive the input from intermediary device 1220 and update the media stream that remote device 1236 transmits to intermediary device 1220 according to the input. System 1200 and/or each of components 1202, 1220, and 1236 may comprise any number of components and may communicate in any manner.

Game console 1202 may be similar to game console 201, shown and described with reference to FIG. 2A. Game console 1202 is shown to include a processing circuit 1204, a pedal system 1210, a joystick 1212, sensors 1214, command buttons 1216, and a communication interface 1218, in some embodiments. Processing circuit 1204 is shown to include a processor 1206 and a memory 1208. Each of components 1204-1216 may be similar to their respective corresponding components of game console 201 of FIG. 2A. Sensors 1214 may include sensors such as gyroscopes, accelerometers, magnetometers, and/or temperature sensors, but may include any type of sensor. Similarly, communication interface 1218 may be similar to network interface 220 of FIG. 2A.

Communication interface 1218 may communicate with a communication interface 1230 of intermediary device 1220. Communication interface 1218 may communicate with communication interface 1230 by transmitting generated data that is received by processing circuit 1204 from the various hardware components (e.g., pedal system 1210, joystick 1212, sensors 1214, and/or command buttons 1216) of game console 1202 to communication interface 1230. Communication interface 1218 can include a software or hardware-based communication interface. For example, communication interface 1218 can be a hardware port through which game console 1202 connects to a network, or a software component of, for example, a web browser executed by processing circuit 1204. In some implementations, communication interface 1218 may communicate with communication interface 1230 over a LAN network, a Wi-Fi network, a cellular network, a wide area network, a telephone network, a wireless link, a satellite link, a device-to-device mesh network, an intranet, the Internet, or a combination thereof. In some embodiments, communication interface 1218 may communicate with communication interface 1230 over Bluetooth or Bluetooth Low Energy. Communication interface 1218 may communicate with communication interface 1230 via any communication protocol.

In some embodiments, for example, processing circuit 1204 may use various Bluetooth and/or Bluetooth Low Energy services such as a device information service, a battery service, and/or an HID service to obtain or store various information about game console 1202 and/or transmit such information to intermediary device 1220. For example, the device information service may include information about game console 1202 such as a device identifier (serial number) of game console 1202. Through the battery service, processing circuit 1204 may obtain information related to a current amount of battery of game console 1202 and/or the health of the battery of game console 1202. Through the HID service, processing circuit 1204 may receive and/or convert any inputs it receives into HID-compliant signals. Processing circuit 1204 may transmit information from each of these services to intermediary device 1220 via communication interface 1218.

In some embodiments, processing circuit 1204 may also use custom services for communications between game console 1202 and intermediary device 1220. For example, processing circuit 1204 may use an Rx/Tx service that enables processing circuit 1204 to communicate with an application 1228 of intermediary device 1220. Processing circuit 1204 may also use an IMU service that enables processing circuit 1204 to collect and/or transmit data generated by sensors 1214 to intermediary device 1220. Processing circuit 1204 may further use a button and/or joystick service that enables processing circuit 1204 to collect and/or transmit the current states of command buttons 1216 (e.g., pressed or unpressed) and/or joystick 1212 (e.g., a current position or a current position in relation to a previous position) to intermediary device 1220. Processing circuit 1204 may implement or use any services to collect and/or transmit data to intermediary device 1220.

Processing circuit 1204 may collect values through the IMU service. The IMU service may enable processing circuit 1204 to collect values from one or more gyroscopes, one or more accelerometers, one or more magnetometers, and one or more temperature sensors of sensors 1214 and generate a packet of sensor data with the collected values. The IMU service may enable processing circuit 1204 to collect sensor data through one or more ports of game console 1202. Processing circuit 1204 may collect values from any sensor and/or any sensor type of sensors 1214. Processing circuit 1204 may collect the values from sensors 1214 by polling the sensors 1214 at predetermined intervals and/or in response to one or more of sensors 1214 generating data and transmitting the data to processing circuit 1204. In some embodiments, the values of the collected values may correspond to a current position or orientation of game console 1202. The values may each be signed 16-bit integer values within a range of values. For example, in one embodiment, the range of values may be between −32768 and +32767. The range of values may be between any numbers.

In some embodiments, processing circuit 1204 may generate packets of sensor data comprising one or more data strings that are associated with the same or similar times as data obtained from sensors 1214 through the IMU service. The values of the collected sensor data may be associated with timestamps indicating times that the values were collected and/or generated. Processing circuit 1204 may identify values that are associated with the same or similar times (e.g., times that are within a threshold of each other). Processing circuit 1204 may identify the values associated with the same or similar times and, in some implementations, concatenate the identified values together, forming a concatenated data string. A formed concatenated data string may include a predetermined number (e.g., 10) of concatenated 16-bit signed integer values. For example, in one embodiment, a formed concatenated data string may include 16-bit integer values from three gyroscopes, three accelerometers, three magnetometers, and a temperature sensor. In some implementations, the concatenated data string may not have delimiters between different values; instead, each value may have a predetermined length and appear in a predetermined order, such that a recipient device may extract the values according to the predetermined length and order. In other implementations, the data string may have delimiters or other identifiers between values (e.g. commas, line feeds, XML tags, etc.).

Similarly, processing circuit 1204 may generate a data packet including data from button and/or joystick data obtained through the button and joystick service in a bit array. Processing circuit 1204 may collect values from joystick 1212 and command buttons 1216 and generate a bit array including the values. Processing circuit 1204 may collect the values by polling joystick 1212 or command buttons 1216 at predetermined intervals and/or in response to one or more sensors of joystick 1212 or command buttons 1216 generating data. A bit array may comprise a plurality of concatenated bits in a concatenated data string similar to the concatenated data string of sensor data, and may include or not include delimiters or other identifiers. The bit array may include bits that correspond to the state of one or more command buttons of command buttons 1216 or a predetermined number (e.g., 2) of 16-bit signed integers that correspond to an x-position or y-position of joystick 1212. In some embodiments, processing circuit 1204 may similarly collect and/or include values generated by sensors of pedal system 1210 in the bit array. In the bit array, the state of the command buttons of command buttons 1216 may be represented by a binary number. For example, processing circuit 1204 may generate the number "1" for a bit that corresponds to a command button responsive to determining that the command button was pressed and the number "0" for the same bit responsive to determining that the command button was not pressed or that the command button was otherwise released. The processing circuit 1204 may perform similar operations for each command button of command buttons 1216.

Processing circuit 1204 may also generate the bit array by generating a value corresponding to an x-axis position of joystick 1212 and a value corresponding to a y-axis position of joystick 1212. One or more sensors of joystick 1212 may generate an x-axis value and/or a y-axis value responsive to detecting joystick 1212 moved and a magnitude (e.g., distance from a center position or from a previous position) of the movement. The values may be proportional to a magnitude of movement away from a calibrated position or a previous position on the respective y-axis or x-axis. The one or more sensors of joystick 1212 may transmit generated values to processing circuit 1204. Processing circuit 1204 may receive each value from the one or more sensors of joystick 1212. Processing circuit 1204 may concatenate values that correspond with the x-axis position of joystick 1212, values that correspond with the y-axis position of joystick 1212, and/or values that correspond to the state of each of the buttons into a concatenated data string that makes up the bit array. In some embodiments, processing circuit 1204 may generate the bit array by concatenating joystick and button values responsive to determining that the joystick and button values are associated with a matching timestamp indicating when the values were collected or generated.

Processing circuit 1204 may transmit the packet of sensor data and/or the bit array of joystick and/or command button data to intermediary device 1220. Processing circuit 1204 may transmit the packets of sensor data at predetermined intervals (e.g., every five milliseconds, 10 milliseconds, 20 milliseconds, etc.), pseudo-randomly, and/or upon receiving generated from one or more sensors. Processing circuit 1204 may transmit the packet of sensor data and/or the bit array of joystick and/or command button data to intermediary device 1220 at any rate. Processing circuit 1204 may transmit the bit array to intermediary device 1220 by including the bit array in the packet of sensor data or by transmitting the bit array in a separate data packet.

In some embodiments, processing circuit 1204 may only transmit data to intermediary device 1220 with which intermediary device 1220 is subscribed. A subscription may indicate an authorization or permission for processing circuit 1204 to transmit data that is associated with or originated at a particular characteristic (e.g., pedal system 1210, joystick 1212, a sensor of sensors 1214, a command button of command buttons 1216, etc.) of game console 1202. Processing circuit 1204 may receive an indication for any combination and/or any number of characteristics of game console 1202. Upon receiving an indication for one or subscriptions to characteristics, processing circuit 1204 may store a flag or update a setting in a database associated with the characteristic to indicate that processing circuit 1204 is authorized to transmit data that is associated with the subscribed characteristic. In some embodiments, processing circuit 1204 may not transmit data to intermediary device 1220 that is not associated with a subscribed characteristic.

Intermediary device 1220 may be a computing device similar to display device 222, shown and described with reference to FIG. 2. In some embodiments, intermediary device 1220 may be a cellular phone such as a smartphone that can process games and/or applications and/or display media streams that are associated with such games or applications. Intermediary device 1220 is shown to include a processing circuit 1222, communication interface 1230, a display 1232, and a communication interface 1234. Intermediary device 1220 may include any number of components.

Communication interface 1230 may be or may include a communication interface that communicates with communication interface 1218 of game console 1202. Communication interfaces 1230 and 1218 may communicate with each other via the same communication protocols, such as for example, Bluetooth, Bluetooth Low Energy, etc. Communication interface 1230 may communicate with communication interface 1218 through any communication protocol similar to the communication protocols described above with respect to communication interface 1218.

Processing circuit 1222 is shown to include a processor 1224 and a memory 1226. Processing circuit 1222 may include similar components to processing circuit 1204. Memory 1226 is shown to include an application 1228. Application 1228 may be configured to access the data that intermediary device 1220 receives from game console 1202 through communication interface 1230. As described below, application 1228 may receive data associated with inputs to game console 1202 via a first communication interface and transmit corresponding data to remote device 1236 via a second communication interface. Consequently, inputs may be transmitted from game console 1202 to remote device 1236 despite game console 1202 not having any direct communication with remote device 1236.

In some implementations, application 1228 may be configured to transmit one or more requests to subscribe to characteristics of game console 1202 (e.g. for periodic delivery of values of sensors, pedal system, etc.). Subscribing may refer to selecting values or types of values to be periodically delivered to application 1228 and/or intermediary device 1220 without requiring further additional requests. For example, game console 1202 may transmit sensor values to a subscribed intermediary device 1220 every ten milliseconds, without requiring subsequent requests for each new transmission. Subscription requests may include indications of characteristics of game console 1202 that causes game console 1202 to update a setting associated with the indicated characteristic. Application 1228 may transmit subscription requests to game console 1202 in response to receiving an indication that intermediary device 1220 has entered a communication range with game console 1202 that enables communication interface 1230 to communicate with communication interface 1218. For example, application 1228 may transmit a subscription request to game console 1202 upon detecting that communication interface 1230 can communicate with communication interface 1218 via Bluetooth Low Energy. In some embodiments, application 1228 may be configured to transmit subscription requests in response to receiving an input via a user interface of intermediary device 1220.

Application 1228 may be configured to subscribe to various characteristics based on inputs to the user interface or settings associated with application 1228. For example, application 1228 may receive an input at the user interface of intermediary device 1220 indicating to only collect data from a command button of command buttons 1216. In another example, application 1228 may be associated with settings that cause application 1228 to automatically subscribe to each characteristic of game console 1202. Such settings may be changed in response to a user input at the user interface of intermediary device 1220. Application 1228 may receive inputs to subscribe to any combination of characteristics and transmit subscription requests corresponding to the inputs to game console 1202.

Application 1228 may be configured to extract values from the packets of sensor data that application 1228 receives from game console 1202. Packets of sensor data may include, in some embodiments, one or more data strings associated with data generated by sensors 1214 and/or one or more data strings associated with data generated by joystick 1212 and/or command buttons 1216. Application 1228 may extract one or more data strings from the packets of sensor data by reading the values of the concatenated data strings of the packets of sensor data. Application 1228 may extract one or more data strings associated with sensor data and/or command button and/or joystick data. Application 1228 may extract the one or more data strings according to delimiters or identifiers in the data, or based on predetermined lengths and orders of values (e.g. 16-bit values for accelerometers X, Y, and Z, etc.).

Application 1228 may be configured to establish a transport layer communication session with remote device 1236. Application 1228 may establish the transport layer communication session with remote device 1236 via a transport layer server (not shown) being executed on remote device 1236. The transport layer server may be a part of an agent 1244 that enables communication between remote device 1236 and other devices. The transport layer server may operate a transmission control protocol (TCP) and/or a user datagram protocol (UDP). Application 1228 may transmit a request to the transport layer server of remote device 1236 to establish a connection session with the transport layer server of remote device 1236. The transport layer server may receive the request and establish a communication session by passing the request to a session layer of agent 1244. In response to receiving the request, the session layer of agent 1244 may open a communication session between agent 1244 and application 1228.

In response to establishing a communication session with the transport layer server of agent 1244, Application 1228 may encapsulate the extracted one or more data strings that may be transmitted to remote device 1236 via a second communication protocol. Application 1228 may encapsulate the extracted one or more data strings in a transport layer header of a communication protocol utilized by communication interfaces 1234, 1252 (e.g. transport control protocol, user datagram protocol, etc.). In some implementations, application 1228 may also encapsulate the extracted one or more data strings in a session or application layer header (e.g. HTTP headers). Upon encapsulating the extracted one or more data strings in the transport layer header, application 1228 may transmit the extracted one or more data strings to agent 1244 of remote device 1236 through communication interface 1234.

Communication interface 1234 may be a communication interface that communicates with a communication interface 1252 of remote device 1236. Communication interface 1234 may implement a different communication protocol than communication interface 1218 and/or 1230 for such communications. For example, communication interface 1234 may communicate using a Wi-Fi protocol while communication interfaces 1218 and 1230 may communicate using a Bluetooth Low Energy protocol. Communication interface 1234 may transmit the encapsulated extracted one or more data strings to the transport server of agent 1244 via communication interface 1252. Communication 1252 may communicate with communication interface 1234 via any communication protocol.

Remote device 1236 may be a computing device that is similar to remote device 228, shown and described with reference to FIG. 2A. Remote device 1236 is shown to include a processing circuit 1238 and communication interface 1252. Communication interface 1252 may communicate with communication interface 1234, as described above. In some embodiments, communication interface 1252 may not be in communication with communication interface 1218 of game console 1202. Processing circuit 1238 is shown to include a processor 1240 and a memory 1242. Memory 1242 is shown to include agent 1244 and an operating system 1246. As described below, agent 1244 and operating system 1246 may cooperate to receive data strings from intermediary device 1220 and use the data strings to update a media stream that is currently being transmitted to intermediary device 1220.

Agent 1244 may receive the encapsulated extracted data strings from application 1228 via the transport layer of operating system 1246 and/or a network stack, and transcode the encapsulated extracted data strings to HID-compliant data. Agent 1244 may extract the received encapsulated extracted data strings by reading the values of the data strings. Agent 1244 may transcode the extracted data strings to HID-compliant data according to a transformation policy. The transformation policy may include a series of rules and/or thresholds that agent 1244 may apply to data that agent 1244 receives from intermediary device 1220. For example, agent 1244 may apply a rule that translates extracted sensor data to movements of a mouse. The rule may indicate that every degree of movement of the extracted sensor data corresponds to 10 pixels of movement of a cursor on a user interface. Agent 1244 may receive an indication that game console 1202 rotated five degrees to the left, apply the rule to the data corresponding to the rotation, and generate HID-compliant data indicating for the mouse to move 50 pixels to the left on the user interface. Agent 1244 may apply any rule or threshold of the transformation policy to data it receives from intermediary device 1220 to generate HID-compliant data.

Agent 1244 may write the generated HID-compliant data into an HID driver 1248 of operating system 1246. HID driver 1248 may be an HID kernel driver of operating system 1246 that may emulate or spoof an HID-compliant device, and may sometimes be referred to as a virtual HID device, a virtual joystick, a virtual HID driver, or by similar terms. Agent 1244 may reserve memory in HID driver 1248. Upon receiving an encapsulated concatenated data string from intermediary device 1220, agent 1244 may extract the data from the data string and transcode the data to HID-compliant data as described above. Agent 1244 may insert the HID-compliant data into the reserved memory of HID driver 1248. In turn, an application 1250 of operating system 1246 may read the HID-compliant data as if an HID-compliant device such as a controller, a joystick, a mouse, a keyboard, etc., were providing the data to operating system 1246. Accordingly, the operating system 1246 and/or application 1250 may be agnostic to or unable to determine that the data comes from remote game console 1202 via intermediary device 1220, rather than a locally connected USB joystick or other such device. Application 1250 may read the signals and update a media stream that application 1250 concurrently provides to intermediary device 1220 for display according to the HID-compliant data.

In some embodiments, HID driver 1248 may be or may include two HID drivers or include dedicated memory for two separate HID-compliant devices. For example, HID driver 1248 may emulate separate devices of a computing device such as a mouse and a keyboard, or a mouse and a joystick. To do so, HID driver 1248 may include space for memory that is dedicated to a mouse device and space for memory that is dedicated to a keyboard device. Agent 1244 may receive data packets from intermediary device 1220, identify the data that is associated with the mouse device and the data that is associated with the keyboard device, and place the data into the memory of HID driver 1248 according to their designations. In instances in which HID driver 1248 includes memory that is dedicated to two different devices or there are two HID drivers of operating system 1246, agent 1244 may determine where to assign the values of the extracted data based on the location (e.g., bit or index) of the values within the concatenated data stings. Continuing with the example above, joystick data may be associated with particular bits of a concatenated data string including values from command buttons 1216 and joystick 1212. Command buttons 1216 may be associated with other bits of the concatenated data string or a different concatenated data string. Agent 1244 may associate the bits of the concatenated data string with a respective data type so the data from the joystick bits may be allocated to memory associated with the mouse virtual HID-compliant device and data from the command buttons 1216 may be allocated to memory associated with the keyboard virtual HID-compliant device. Agent 1244 may associate bits with any number or type of devices.

Application 1250 may be an application such as a game that generates a user interface for display on display 1232 of intermediary device 1220. In some embodiments, application 1250 may also read the memory of HID driver 1248 as agent 1244 writes commands into the memory. Application 1250 may identify written commands of agent 1244 and update the media stream according to the commands. For example, application 1250 may be a browser. The browser may be displaying a webpage on display 1232 of intermediary device 1220. Agent 1244 may identify sensor data movements from the memory of HID driver 1248 and move a cursor being displayed on display 1232 according to the sensor data movements.

Figure 13:
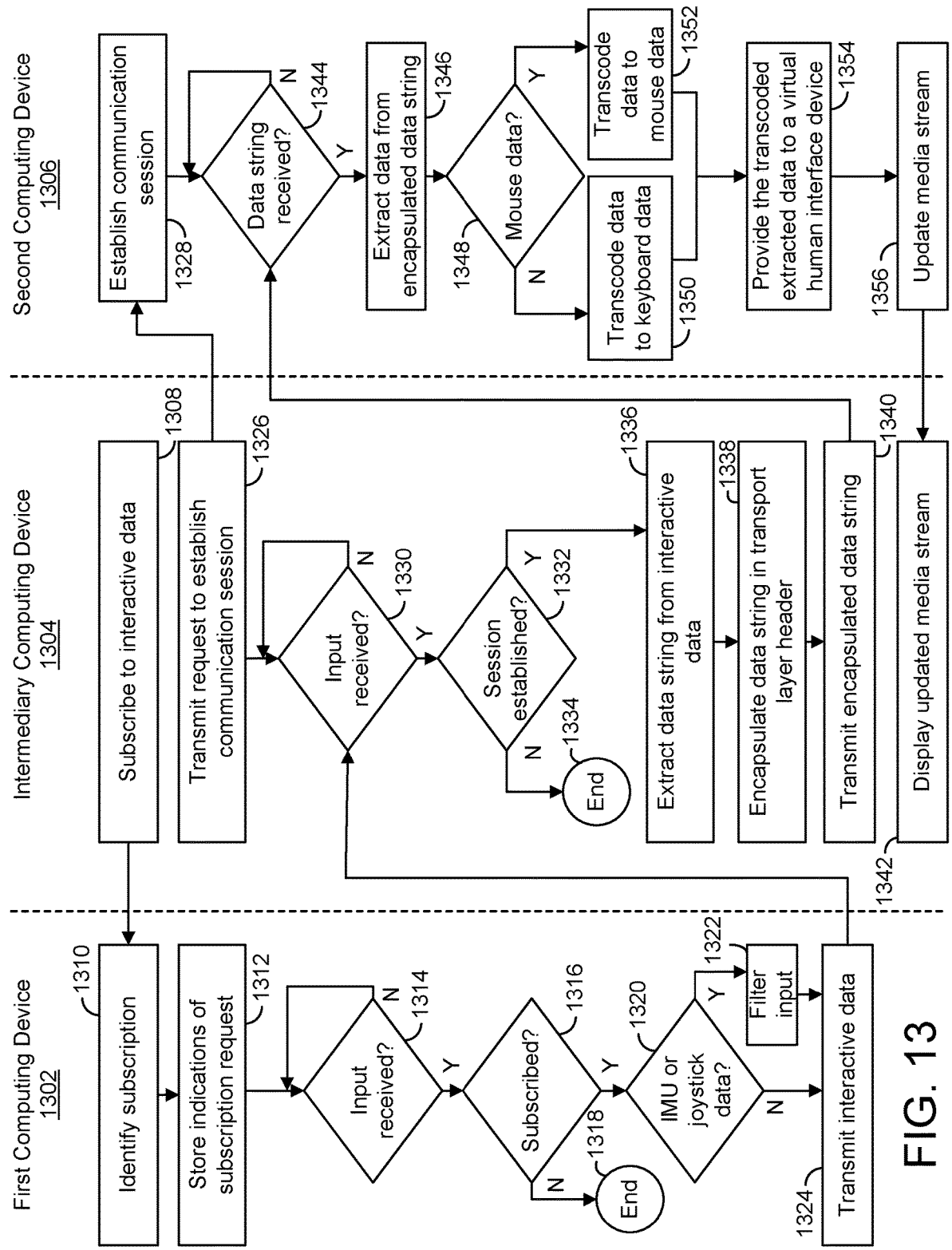
FIG. 13 is an example flowchart outlining communicating interactive data between heterogeneous devices, in accordance with some embodiments of the present disclosure.

FIG. 13 is an example flowchart outlining communicating interactive data between heterogeneous devices, in accordance with some embodiments of the present disclosure. Additional, fewer, or different operations may be performed in the method depending on the implementation and arrangement. A method may be conducted by a combination of a first computing device 1302 (e.g., game console 1202), an intermediary computing device 1304 (e.g., intermediary device 1220), and a second computing device 1306 (e.g., remote device 1236). The method may be conducted by any number of computing devices. The method may enable a first computing device to indirectly communicate interactive data to a second computing device through an intermediary computing device via different wireless interfaces or communication protocols. Consequently, first computing device 1302 can communicate interactive data to second computing device 1306 in scenarios in which the first computing devices 1302 does not have the capability to directly communicate with second computing device 1306.

At operation 1308, intermediary computing device 1304 may subscribe to interactive data. Interactive data may be data that is generated by a sensor or another hardware component of first computing device 1302. First computing device 1302 may include one or more hardware components such as, but not limited to, buttons, a joystick, sensors (e.g., gyroscopes, accelerometers, temperature sensors, etc.), and/or a pedal system that may each generate interactive data responsive to a user interaction with the respective component and/or at predetermined intervals. Hardware components may generate interactive data via sensors that are coupled or otherwise associated with the hardware components. Intermediary computing device 1304 may subscribe to periodically receive interactive data from sensors associated with the hardware components of first computing device 1302 by submitting a request to first computing device 1302. The request may include indications of sensors or hardware components to which intermediary computing device 1304 is subscribing. Intermediary computing device 1304 may communicate the request to first computing device 1302 via a Bluetooth interface, Bluetooth Low Energy interface, or any other wired or wireless interface.

At operation 1310, first computing device 1302 may identify the indications from the request. First computing device 1302 may receive the request and identify the indications in the request. At operation 1312, first computing device 1302 may compare the indications to settings in a database and adjust or update settings that match indications from the request. A setting may be an indication of whether the intermediary computing device 1304 is subscribed to data that is generated by one or more sensors or hardware components (e.g., sensors of hardware components) that are associated with the setting. Each sensor or hardware component may be associated with a different setting. For example, a setting may be an indication of whether intermediary computing device 1304 is subscribed to receive joystick data generated by a joystick of first computing device 1302. A setting may be a binary value such as "1" if intermediary computing device 1304 is subscribed to a sensor or hardware component or "0" if intermediary computing device 1304 is not subscribed to a sensor or hardware component.

In some embodiments, first computing device 1302 may store profiles for various computing devices. Profiles may be associated with settings to which computing devices may subscribe as described above. A profile may be associated or linked with an identifier such as a device identifier of a computing device or an account identifier of a user account of the computing device. In such embodiments, intermediary computing device 1304 may include an identifier in the subscription request to first computing device 1302. First computing device 1302 may identify the identifier from the request and compare the identifier to identifiers of profiles stored in a database of first computing device 1302. First computing device 1302 may identify a profile of the database that is associated with a matching identifier and update the settings of profile according to the indications in the request.

At operation 1314, first computing device 1302 may determine whether an input has been received. First computing device 1302 may poll the sensors and/or other hardware components of first computing device 1302 at predetermined or pseudo-random intervals. In some embodiments, first computing device 1302 may determine if an input has been received based on whether there is a change in values being generated by the sensors and/or other hardware components. For example, first computing device 1302 may poll sensors of an IMU of first computing device 1302 and determine if the sensors have generated any data since a previous polling. First computing device 1302 may poll sensors of each or any portion of the sensors of first computing device 1302. If first computing device 1302 does not detect any generated data from such polling, first computing device 1302 may poll the sensors and/or other hardware components again. First computing device 1302 may perform operation 1314 until determining that one or more inputs have been received.

In some embodiments, first computing device 1302 may determine that an input has been received based on receiving data from one or more of the sensors or hardware components. The one or more sensors or hardware components may generate and/or transmit data to first computing device 1302 in response to a user interaction. Examples of user interactions include, but are not limited to, manipulating (e.g., moving) first computing device 1302, which can cause IMU sensors to generate data; moving a joystick of first computing device 1302, which can cause joystick sensors to generate data; a push of a button, which can cause the buttons or one or more sensors of the buttons to generate data, etc. The sensors or hardware components may generate data and transmit the data to a processing circuit of first computing device 1302. First computing device 1302 may determine an input was received responsive to the processing circuit receiving the generated data.

At operation 1316, first computing device 1302 may determine whether intermediary computing device 1304 is subscribed to the interactive data that is generated at a sensor or hardware component. First computing device 1302 may identify which sensor or hardware component generated and/or transmitted the data based on the port or service (e.g., Bluetooth or Bluetooth Low Energy service) that first computing device 1302 used to receive the data. First computing device 1302 may compare an identification of the identified sensor or hardware component to a setting that is associated with the identified sensor or hardware component and determine whether intermediary computing device 1304 is subscribed to the sensor or hardware component based on the setting. For example, first computing device 1302 may identify data generated by a command button of first computing device 1302. Intermediary computing device 1304 may identify a command button setting that indicates whether intermediary computing device 1304 is subscribed to data generated by the command button or otherwise the command button. First computing device 1302 may determine whether intermediary computing device 1304 is subscribed to the command button based on the setting. In response to first computing device 1302 determining intermediary computing device is not subscribed to data generated by a sensor of first computing device 1302, at operation 1318, the process of FIG. 13 may end.

However, responsive to first computing device 1302 determining that intermediary computing device 1304 is subscribed to the generated interactive data, at operation 1320, first computing device 1302 may determine whether the interactive data is IMU or joystick data. First computing device 1302 may do so by identifying the port or service through which the processing circuit of first computing device 1302 received the interactive data. For example, each sensor or hardware component may transmit data to a processing circuit of first computing device 1302 through a different port or service. First computing device 1302 may identify the port or service that received the data and identify the sensor or hardware component that transmitted the data based on the identified port or service.

Responsive to first computing device 1302 determining that the interactive data is IMU or joystick data (e.g., was generated by a sensor of the IMU or joystick,), at operation 1322, first computing device 1302 may filter the interactive data. First computing device 1302 may filter the interactive data by averaging the interactive data across different timestamps and/or performing offset compensation to reduce drift. First computing device 1302 may perform the offset compensation by identifying values of the interactive data and subtracting a predetermined number (e.g., an offset) from the interactive data. In some embodiments, first computing device 1302 may filter interactive data responsive to determining the interactive data is any type of data.

At operation 1324, first computing device 1302 may transmit the interactive data to intermediary computing device 1304. First computing device 1302 may transmit filtered interactive data responsive to the interactive data being filtered at operation 1322 or unfiltered interactive data response to the interactive data not being filtered. First computing device 1302 may transmit the interactive data to intermediary computing device 1304 via a wireless or wired communication interfaces such as, but not limited to, Bluetooth, Bluetooth Low Energy, WiFi, or any other communication interface or protocol as described above.

First computing device 1302 may transmit subscribed interactive data to intermediary computing device 1304 as at least one data string. A data string may include values that correspond to sensor data generated by sensors of the IMU. The values may correspond to a current position or orientation of first computing device 1302. The values may each be signed 16-bit integer values within a range of values. For example, in one embodiment, the range of values may be between −32768 and +32767. The range of values may be between any numbers.

In some embodiments, first computing device 1302 may generate packets of sensor data comprising one or more data strings that are associated with the same or a similar time (e.g., within a threshold) from data obtained from sensors of the IMU. A data string may be a formed concatenated data string that includes a predetermined number (e.g., 10) of concatenated 16-bit signed integer values. For example, in one embodiment, a formed concatenated data string may include 16-bit integer values from three gyroscopes, three accelerometers, three magnetometers, and a temperature sensor. The data string may include values that were generated by the sensors and/or values to which intermediary computing device is subscribed. If a sensor did not generate a value or if intermediary computing device 1304 is otherwise not subscribed to receive data generated by the sensor, first computing device 1302 may generate a null or zero for the bit or value of the data string that is associated with the sensor.

Similarly, first computing device 1302 may generate a data packet including data from button and/or joystick data obtained from sensors of the command buttons or the joystick in a bit array. First computing device 1302 may collect the values from sensors of the joystick and command buttons and generate a bit array including the values. A bit array may comprise a plurality of concatenated bits in a concatenated data string similar to the concatenated data string of sensor data. The bit array may include bits that correspond to states of command buttons or a predetermined number (e.g., 2) of 16-bit signed integers that correspond to an x-position and/or a y-position of the joystick. In some embodiments, first computing device 1302 may similarly include values generated by sensors of a pedal system of first computing device 1302 in the bit array. In the bit array, the state of the command buttons may be represented by a binary number. For example, first computing device 1302 may generate the number "1" for a bit that corresponds to a command button responsive to determining that the command button was pressed and the number "0" for the same bit responsive to determining that the command button was not pressed or that the command button was otherwise released. The first computing device 1302 may perform similar operations for each command button.

First computing device 1302 may also generate the bit array by generating a first value corresponding to an x-axis position of the joystick and a second value corresponding to a y-axis position of the joystick. One or more sensors of the joystick may generate an x-axis value and/or a y-axis value responsive to detecting the joystick moved and a magnitude (e.g., a distance from a center position or from a previous position) of the movement. The value may be proportional to a magnitude of movement away from a calibrated position or a previous position. The one or more sensors of the joystick may transmit generated values to the processing circuit of first computing device 1302. The processing circuit may receive each value from the one or more sensors of the joystick. First computing device 1302 may concatenate values that correspond with the x-axis position of the joystick, values that correspond with the y-axis position of the joystick, and/or values that correspond to the state of each of the buttons into a concatenated data string that makes up the bit array. In some embodiments, first computing device 1302 may include data strings generated from the joystick and/or the command buttons in the same data packet as the data strings of the sensor data from the IMU. If a sensor of the joystick or command buttons did not generate a value or if intermediary computing device 1304 is otherwise not subscribed to receive data generated by the sensor of the joystick or command buttons, first computing device 1302 may generate a null or zero for the bit or value of the data string that is associated with the sensor.

First computing device 1302 may transmit the packet of sensor data and/or the bit array of joystick and/or command button data to intermediary computing device 1304. First computing device 1302 may transmit the packets of sensor data at predetermined intervals (e.g., every five milliseconds, 10 milliseconds, 20 milliseconds, etc.), pseudo-randomly, and/or upon receiving a request for such data from intermediary computing device 1304. First computing device 1302 may transmit the packet of sensor data and/or the bit array of joystick and/or command button data to intermediary computing device 1304 at any rate. First computing device 1302 may transmit the bit array to intermediary computing device 1304 by including the bit array in the packet of sensor data (e.g., by concatenating the bit array to a concatenated data string that is associated with the same or a similar timestamp) or by transmitting the bit array in a separate data packet.

At operation 1326, first computing device 1302 may transmit a request to establish a communication session with second computing device 1306. First computing device 1302 may transmit the request via a communication interface that is different from the communication interface with which intermediary computing device 1304 communicates with first computing device 1302. For example, first computing device 1302 may communicate with intermediary computing device via Bluetooth Low Energy and intermediary computing device 1304 may communicate with second computing device 1306 via WiFi. Intermediary computing device 1304 may communicate with first computing device 1302 and/or second computing device 1306 via any communication protocol.

At operation 1328, second computing device 1306 may receive the request to establish the communication session and establish a transport layer communication session between an agent of second computing device 1306 and an application of intermediary computing device 1304. Second computing device 1306 may receive the request via a transport layer server of second computing device 1306. An agent of second computing device 1306 may establish a session of communication that enables the application of intermediary computing device 1304 to communicate with the agent of second computing device 1306. Upon establishing a session, second computing device 1306 may transmit a signal back to intermediary computing device 1304 indicating a session was successfully established. Intermediary computing device 1304 may store an indication in a data structure of intermediary computing device 1304 indicating the session was established responsive to receiving the signal from second computing device 1306.

At operation 1330, intermediary computing device 1304 may determine whether intermediary computing device 1304 received interactive data from first computing device 1302. Intermediary computing device 1304 may receive interactive data after first computing device 1302 generates data through one or more sensors and transmits the generated data to intermediary computing device 1304 as described above. Intermediary computing device 1304 may determine that the interactive was received responsive to receiving the interactive data from first computing device 1302.

Responsive to intermediary computing device 1304 determining that interactive data was received, at operation 1332, intermediary computing device 1304 may determine whether a session was established with second computing device 1306. Intermediary computing device 1304 may determine whether a session was established by determining if there is an indication of such a session stored in intermediary computing device 1304. Responsive to intermediary computing device 1304 determining there is not an indication of an established session with second computing device 1306, the method of FIG. 13 may end at operation 1334. In some implementations, steps 1332-1334 may be performed prior to step 1330.

However, responsive to intermediary computing device 1304 determining that there is an indication of an established session or that a session was otherwise established, at operation 1336, intermediary computing device 1304 may extract at least one data string from the interactive data that intermediary computing device 1304 received from first computing device 1302. The at least one data string may include a data string of joystick and button data and/or IMU sensor data. Intermediary computing device 1304 may extract the at least one data string by reading the at least one data string from the data packet of interactive data that first computing device transmits.

At operation 1338, intermediary computing device 1304 may encapsulate the at least one data string in a transport layer header. The application of intermediary computing device 1304 may encapsulate the at least one data string from an application layer of the application in a transport layer header of the application. At operation 1340, intermediary computing device 1304 may transmit the encapsulated one or more data strings to second computing device 1306 via the application.

At operation 1342, second computing device 1306 may determine whether second computing device 1306 has received any sensor data from intermediary computing device 1304. Sensor data may include at least one encapsulated data string including data generated by one or more sensors. Second computing device 1306 may receive the sensor data as a packet including encapsulated sensor data from intermediary computing device 1304. Second computing device 1306 may receive the sensor data via the agent of second computing device 1306 that can communicate with the application of intermediary computing device 1304 over a communication interface. Intermediary computing device 1304 may determine that the sensor data was received responsive to receiving the sensor data from intermediary computing device 1304.

Responsive to receiving the sensor data, at operation 1344, second computing device 1306 may extract data from the encapsulated data string of the sensor data. Second computing device 1306 may extract the data by reading the data from the encapsulated data string. Second computing device 1306 may extract data from any number of encapsulated data strings that may be included in a packet comprising sensor data.

At operation 1346, via the agent, second computing device 1306 may determine whether the extracted data is associated with mouse data or keyboard data. Second computing device 1306 may do so by identifying the bit or index value of the data string from which second computing device 1306 is extracting data and identifying whether the index value is associated with mouse data or keyboard data based on the bit or index value. Mouse data may be data that can be used to spoof mouse inputs such as, but not limited to, detected movements on an x-axis or y-axis, button clicks, or detected movements of a wheel on the mouse, etc., on a computing device. Keyboard data may be data that can be used to spoof keyboard inputs on a computing device. Second computing device 1306 may be configured to associate bits or index values of data strings with mouse data or keyboard data based on associations between the bit or index values and the mouse data or keyboard data that are stored in a database of second computing device 1306. Second computing device 1306 may identify the bit or index value of extracted data from the data string and identify whether the bit or index value is associated with mouse data or keyboard data by comparing the bit or index value to the database.

Responsive to second computing device 1306 determining the extracted data is not associated with mouse data (e.g., keyboard data), at operation 1348 and via the agent, second computing device 1306 may transcode the data into keyboard data. Second computing device 1306 may transcode the data into keyboard data by applying a predetermined set of rules to the extracted data. For example, second computing device 1306 may determine extracted data from a particular command button of first computing device 1302 is associated with a letter "J." Upon receiving data generated by the command button, the agent of second computing device 1306 may transcode the data into data identifying the letter J. Second computing device 1306 transcode data into any keyboard input by applying any number of rules.

Responsive to second computing device 1306 determining the extracted data is associated with mouse data, at operation 1350 and via the agent, second computing device 1306 may transcode the data into mouse data. Second computing device 1306 may transcode the data into mouse data by applying a predetermined set of rules to the extracted data. For example, second computing device 1306 may determine that extracted data from the IMU sensors of first computing device 1302 correspond with movements of a cursor on a user interface. Second computing may receive an indication that first computing device 1302 was pointed upwards and transcode data associated with the indication into data that conveys upward movement of the cursor accordingly. Second computing device 1306 transcode data into any mouse input by applying any rule and/or number of rules.

At operation 1352 and via the agent, second computing device 1306 may provide the transcoded extracted data to a virtual human interface device of second computing device 1306. The virtual human interface device may be a virtual driver stored in an operating system of second computing device 1306. The virtual human interface device may spoof an HID-compliant hardware device that may be physically plugged into a port of a computing device. Second computing device 1306 may provide the transcoded extracted data to the virtual human interface device by writing the transcoded extracted data into memory associated with the virtual human interface device.

In some embodiments, second computing device 1306 may include multiple virtual human interface devices in its operating system. For example, second computing device 1306 may include a virtual human interface that spoofs a mouse and a virtual human interface device that spoofs a keyboard. Second computing device 1306 may include any number of virtual human interface devices in its operating system. Second computing device 1306 may determine which virtual human interface device to provide transcoded extracted data based on the type of the transcoded extracted data. For example, second computing device 1306 may identify the type of transcoded extracted data as mouse data based on the determination made at operation 1346. Accordingly, second computing device 1306 may provide the transcoded extracted data to the virtual human interface device associated with a mouse.

At operation 1354, second computing device 1306 may update a media stream that is being provided to intermediary computing device 1304. The media stream may be a user interface of a game or application being run or processed by second computing device 1306. Second computing device 1306 may transmit a user interface of the game or application as a media stream to intermediary computing device 1304, causing the media stream to be displayed. Second computing device 1306 may identify the input from the virtual human interface device and identify a corresponding action that is associated with the game or application. An action may be an in-game action such as a character jumping or another action such as a cursor moving across a user interface. Second computing device 1306 may determine the action based on the game or application being processed and the current state of the game or application. Second computing device 1306 may determine the action and update the media stream according to the action. At operation 1356, intermediary computing device 1304 may display the updated media stream. Intermediary computing device 1304 may display the updated media stream on a display of intermediary computing device 1304

For example, second computing device 1306 may determine that a user reoriented first computing device 1302 to the left responsive to receiving mouse data associated with IMU data indicating that computing device 1302 was reoriented to the left. Second computing device 1306 may be processing a browser application. Second computing device 1306 may update a media stream being transmitted to intermediary computing device 1304 displaying a user interface of the browser application to move a cursor on the media stream to the left.

Advantageously, intermediary computing device 1304 can communicate with first computing device 1302 and second computing device 1306 via different communication interfaces. By doing so, intermediary computing device 1304 may bridge communications between first computing device 1302 and second computing device 1306 when first computing device 1302 and second computing device 1306 do not have compatible communication interfaces with each other. Accordingly, first computing device 1302 may communicate with second computing device 1306 without having a communication interface that enables direct communication between the two.

The various illustrative logical blocks, modules, circuits, and algorithm operations described in connection with the examples disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. For example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for communicating interactive data between heterogeneous devices, comprising:
   receiving, by an intermediary computing device via a first wireless interface from a first computing device, interactive data from at least one sensor of the first computing device;

extracting, by the intermediary computing device, at least one data string from the received interactive data;

encapsulating, by the intermediary computing device, the extracted at least one data string in a transport layer header; and transmitting, by the intermediary computing device via a second wireless interface to a second computing device, the encapsulated at least one data string, wherein the second computing device extracts the at least one data string from the encapsulated transmission and inserts the at least one data string into memory of a virtual human interface device (HID) driver executed by an operating system of the second computing device.

2. The method of claim 1, wherein the first wireless interface is a Bluetooth wireless interface, and wherein the second wireless interface is a WiFi interface.

3. The method of claim 1, wherein the received interactive data comprises data from a gyroscope, an accelerometer, a magnetometer, a temperature sensor, a joystick, or a button.

4. The method of claim 1, wherein the first computing device and the second computing device have no direct communications.

5. The method of claim 1, further comprising transmitting, by the intermediary computing device to the first computing device, a request to subscribe to the interactive data from the at least one sensor.

6. The method of claim 1, further comprising establishing, by the intermediary computing device with the second computing device via the second wireless interface, a transport layer communication session.

7. The method of claim 1, wherein extracting the at least one data string further comprises extracting a plurality of concatenated data strings from the received interactive data, by the intermediary computing device, each of the concatenated data strings having a predetermined length.

8. A system for communicating interactive data between heterogeneous devices, comprising:

an intermediary computing device in communication via a first wireless interface with a first computing device and in communication via a second wireless interface with a second computing device, the intermediary computing device comprising a processor having programmed instructions that, when executed, cause the processor to:

receive, via the first wireless interface from the first computing device, interactive data from at least one sensor of the first computing device;

extract at least one data string from the received interactive data;

encapsulate the extracted at least one data string in a transport layer header; and transmit, via the second wireless interface to the second computing device, the encapsulated at least one data string, wherein the second computing device extracts the at least one data string from the encapsulated transmission and inserts the at least one data string into memory of a virtual human interface device (HID) driver executed by an operating system of the second computing device.

9. The system of claim 8, wherein the first wireless interface is a Bluetooth wireless interface, and wherein the second wireless interface is a WiFi interface.

10. The system of claim 8, wherein the received interactive data comprises data from a gyroscope, an accelerometer, a magnetometer, a temperature sensor, a joystick, or a button.

11. The system of claim 8, wherein the first computing device and the second computing device have no direct communications.

12. The system of claim 8, wherein the programmed instructions, when executed, further cause the processor to transmit, to the first computing device, a request to subscribe to the interactive data from the at least one sensor.

13. The system of claim 8, wherein the programmed instructions, when executed, further cause the processor to establish, with the second computing device via the second wireless interface, a transport layer communication session.

14. The system of claim 8, wherein the programmed instructions, when executed, further cause the processor to extract a plurality of concatenated data strings from the received interactive data, each of the concatenated data strings having a predetermined length.

15. A method for communicating interactive data between heterogeneous devices, comprising:

establishing, by a first computing device with an intermediary computing device, a communication session via a first wireless interface of the intermediary computing device;

receiving, by the first computing device from the intermediary computing device via the communication session, a packet comprising sensor data of a second computing device forwarded by the intermediary computing device, the sensor data received by the intermediary computing device via a second wireless interface and encapsulated by the intermediary computing device in the packet;

extracting, by an agent executed by the first computing device separate from an operating system of the first computing device, the sensor data from the packet; and inserting, by the agent, the extracted sensor data into memory of a virtual human interface device of the operating system of the first computing device.

16. The method of claim 15, wherein the first wireless interface is WiFi; and wherein the second wireless interface is Bluetooth.

17. The method of claim 15, wherein the sensor data comprises concatenated data from a plurality of sensors, each of the concatenated data having a predetermined length.

18. The method of claim 15, wherein the first computing device has no direct communication with the second computing device.

19. The method of claim 15, wherein establishing the communication session comprises executing, by the first computing device, a transport layer server.

20. The method of claim 15, wherein the sensor data is encapsulated in a transport layer header by the intermediary computing device before transmission to the first computing device.

* * * * *